US012649172B1

(12) United States Patent
Serstad et al.

(10) Patent No.: US 12,649,172 B1
(45) Date of Patent: Jun. 9, 2026

(54) STORAGE, RETRIEVAL, ORDER SORTATION AND PACKOUT

(71) Applicant: Tompkins Robotics, Inc., Orlando, FL (US)

(72) Inventors: James M. Serstad, Orlando, FL (US); Michael C. Futch, Cocoa, FL (US); Parthiban A. Mathavan, Cary, NC (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 0 days.

(21) Appl. No.: 19/371,520

(22) Filed: Oct. 28, 2025

(51) Int. Cl.
  *B07C 3/00* (2006.01)
  *B65G 1/137* (2006.01)

(52) U.S. Cl.
  CPC ............. *B07C 3/008* (2013.01); *B65G 1/1378* (2013.01); *B65G 2201/0285* (2013.01)

(58) Field of Classification Search
  CPC ............... B07C 3/008; B65G 1/13278; B65G 2201/0285
  See application file for complete search history.

(56) References Cited

U.S. PATENT DOCUMENTS

| | | | |
|---|---|---|---|
| 5,333,983 A | 8/1994 | Hatouchi | |
| 11,254,506 B1 | 2/2022 | Robin | |
| 11,759,826 B1 | 9/2023 | Baring | |
| 12,330,875 B1 | 6/2025 | Serstad | |
| 2019/0233213 A1* | 8/2019 | Phan-Quiroga | B65G 1/0492 |
| 2020/0078828 A1* | 3/2020 | Futch | B65G 1/137 |
| 2022/0048708 A1* | 2/2022 | Lindley | B65B 5/06 |
| 2023/0271785 A1* | 8/2023 | Gravelle | G06Q 10/087 |
| 2024/0017296 A1 | 1/2024 | Baring | |
| 2025/0033883 A1* | 1/2025 | Vent | B65G 1/065 |

* cited by examiner

*Primary Examiner* — Kyle O Logan
(74) *Attorney, Agent, or Firm* — Parthiban A Mathavan

(57) ABSTRACT

Order fulfillment system comprises a first function sorting system comprising first function vehicles for sorting first function articles into first function sort receptacles in response to commands. The system further comprises an ASRS juxtaposed to the first function sorting system such that a footprint occupied by the first function sorting system is adjacent to the footprint occupied by the ASRS. The system further comprises a controller configured to: direct a retrieval mechanism of the article storage and retrieval system to move a storage bin containing a first function article to an output station; and, direct a first function vehicle to transport and deposit the first function article collected from the storage bin at the output station into a first function sort receptacle.

20 Claims, 16 Drawing Sheets

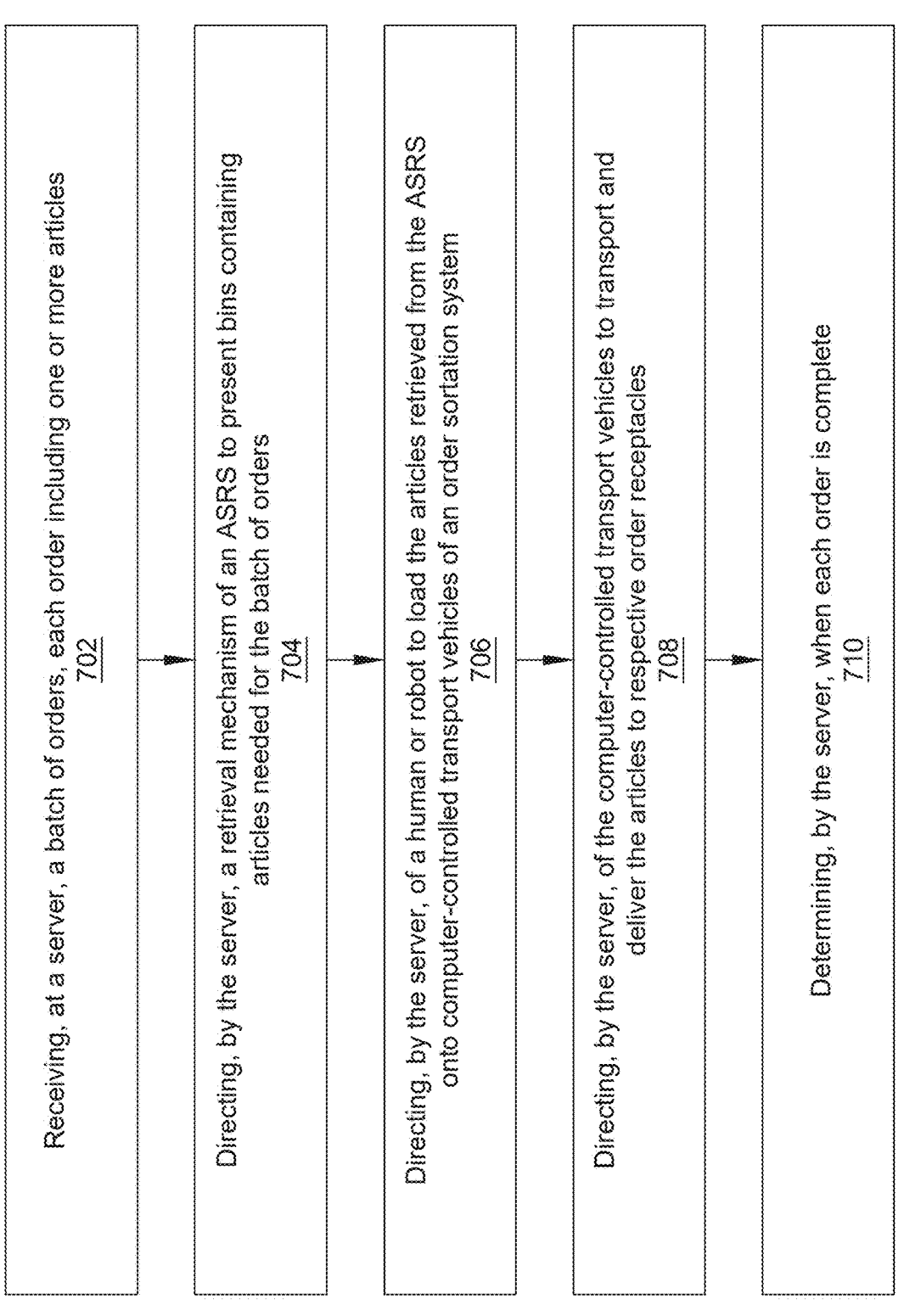

Receiving, at a server, a batch of orders, each order including one or more articles
702

Directing, by the server, a retrieval mechanism of an ASRS to present bins containing articles needed for the batch of orders
704

Directing, by the server, of a human or robot to load the articles retrieved from the ASRS onto computer-controlled transport vehicles of an order sortation system
706

Directing, by the server, of the computer-controlled transport vehicles to transport and deliver the articles to respective order receptacles
708

Determining, by the server, when each order is complete
710

FIG. 15

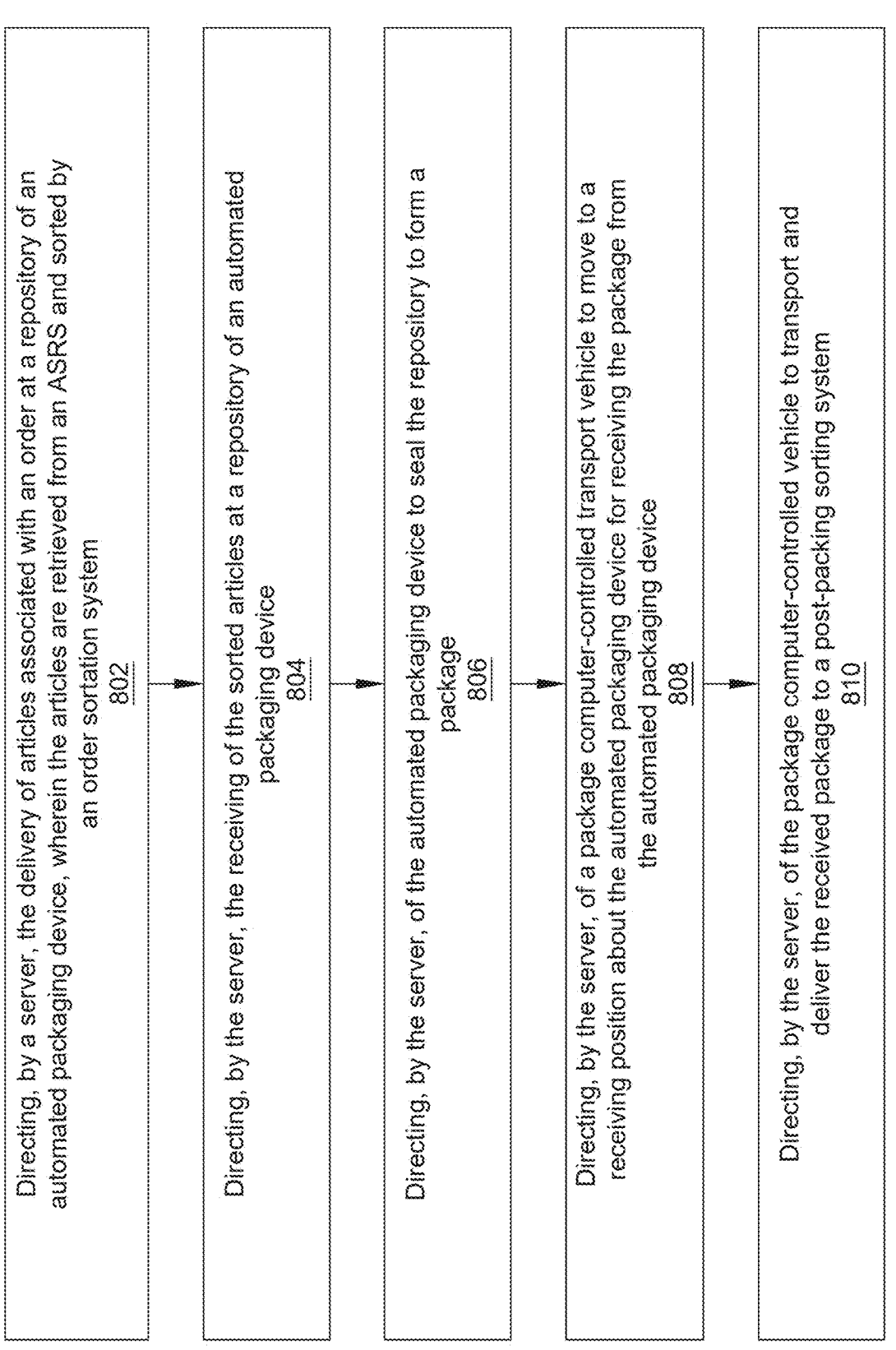

Directing, by a server, the delivery of articles associated with an order at a repository of an automated packaging device, wherein the articles are retrieved from an ASRS and sorted by an order sortation system
802

Directing, by the server, the receiving of the sorted articles at a repository of an automated packaging device
804

Directing, by the server, of the automated packaging device to seal the repository to form a package
806

Directing, by the server, of a package computer-controlled transport vehicle to move to a receiving position about the automated packaging device for receiving the package from the automated packaging device
808

Directing, by the server, of the package computer-controlled vehicle to transport and deliver the received package to a post-packing sorting system
810

FIG. 16

STORAGE, RETRIEVAL, ORDER SORTATION AND PACKOUT

TECHNICAL FIELD

This invention relates generally to the field of warehouse automation, and particularly to systems and methods for sorting articles retrieved from storage bins with automated equipment.

BACKGROUND

Order fulfillment is becoming increasingly ubiquitous as online sales increase and as "just in time" (JIT) delivery to retail locations becomes common. The primary goal is to satisfy customer requirements (like fast delivery and product availability) while minimizing operational costs. Recently, warehouse automation incorporating automated solutions employing robotic components has been introduced to enhance order fulfillment. Warehouse automation refers to the use of technology—including robotics, automated systems, and intelligent software—to perform warehouse tasks with minimal human intervention. By integrating innovative tools such as robots, sensors, conveyor systems, and AI-driven software, automation can handle inventory management, picking, packing, sorting, and material transport far more efficiently and reliably than manual methods.

Modern fulfillment centers are evolving from labor-intensive operations into highly streamlined, high-speed automated systems that improve efficiency, reduce errors, and scale to meet surging demand. For example, in some modern fulfillment centers, ordered items are retrieved from an automated storage and retrieval system (ASRS). An ASRS typically includes a three-dimensional array of storage spaces, with robotic mechanisms operating either on racks/rails that extend across the top of the array and down a number of shafts through the array or in aisles between the racks to automatically store and retrieve articles from the storage spaces and deliver the retrieved articles to one or more output stations. Human operators present at the output stations may then assemble orders from the articles retrieved from the ASRS. Alternatively, automated systems including robots may retrieve articles from storage shelves or bins of the ASRS, which may be faster than manual picking. The picked articles may then be dispatched to an automated packing station.

Technical challenges often arise in pairing the ideal permutations and combinations of technological solutions for the sorting process and the dispatching process that can be coupled with the ASRS equipment, while considering the array of article quantities and types that are to be used to fill customer orders and store replenishment requirements. Accordingly, a need exists for a solution that enables an automated fill system that can optimize a combination of automation technologies to minimize costs while better utilizing available space and equipment capacity and can efficiently dispatch receptacles carrying ordered articles to an automated packing station for packout in an optimal manner.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, a system for use with order fulfillment system is provided. According to various embodiments, the order fulfillment system includes a first function sorting system. The first function sorting system comprises first function vehicles traveling on a first function platform raised from a surface for transporting and depositing first function articles to be sorted into a plurality of first function sort receptacles in response to commands. The order fulfillment system further includes an article storage and retrieval system (ASRS) juxtaposed to the first function sorting system such that a footprint occupied by the first function sorting system is adjacent to the footprint occupied by the ASRS, the article storage and retrieval system comprising a three-dimensional array of storage spaces from which the first function articles to be sorted are automatically retrievable by one or more retrieval mechanisms in response to commands. The order fulfillment system also includes a control server or controller. The control server or controller is configured to: direct a retrieval mechanism of the article storage and retrieval system to move a storage bin containing a first function article to an output station; and, direct a first function vehicle to transport and deposit the first function article collected from the storage bin at the output station into a first function sort receptacle. According to at least one embodiment, the retrieval mechanism further comprises a lift to transfer the first article from the storage bin to the output station. According to at least one embodiment, the retrieval mechanism further comprises a lift to transfer the first article from the storage bin to a position about the first function vehicle.

According to at least one embodiment, the order fulfillment system also includes a receptacle exchanger, wherein the receptacle exchanger comprises: a shelf comprising a plurality of storage locations arranged in one or more levels; and, a frame positioned adjacent the shelf, the frame comprising a lift configured for transferring the receptacle to a storage location of the shelf, wherein the system is configured to direct, by a receptacle exchange engine, the lift to transfer the receptacle from a storage location of the shelf to an article receiving position. According to at least one embodiment, the order fulfillment system also includes an automated packaging device configured to receive one or more sorted first function articles through an opening of a repository of the automated packaging device, and seal the repository to form a package.

According to at least one embodiment, the order fulfillment system also includes a 3D (three-dimensional) sorting system. The 3D sorting system includes two shelves, each shelf composed of a plurality of storage locations vertically arranged on the shelf, each storage location configured to accept therein an article receptacle. The 3D sorting system also includes an article lift translating along three axes about a conveying rail frame. The conveying rail frame is arranged between the two shelves and parallel to at least one of the two shelves. The article lift is configured to sort an article received at the article lift to one of an article receptacle located at one of the plurality of storage locations of a shelf responsive to instructions received from the controller. According to at least one embodiment, an output of the first function sorting system is provided as an input to the 3D sorting system, an output of the 3D sorting system is provided as an input to the automated packaging device. A package output by the automated packaging device is provided as an input to a second function sorting system.

According to at least one embodiment, the order fulfillment system also includes a second function sorting system, wherein an output of one of the first function sorting system is provided as an input to the second function sorting system. According to one embodiment, an output of the first function sorting system is provided as an input to one or more of: a lift, an elevator, and a computer controlled vehicle, for delivery to the second function sorting system. According to at least one embodiment, the second function sorting system comprises second function vehicles different from the first function vehicles traversing a second function platform spaced apart from the first function platform for transporting and depositing second function articles different from the first function articles into second destination sort receptacles different from the first function sort receptacles. According to at least one embodiment, the second function sorting system comprises a package sorting system that is configured to direct a package computer controlled vehicle to move to a receiving position about an automated packaging device for receiving a package from the automated packaging device. The package sorting system is further configured to direct the package computer controlled vehicle to transport and deposit the package into a package receptacle.

According to at least one embodiment, the package computer controlled vehicle traverses a package sorting platform, and an elevator is configured to transfer the package computer controlled vehicle between a floor level and the package sorting platform spaced apart from the floor level. According to at least one embodiment, an elevator transfers the package computer controlled vehicle from a floor level to a package sorting platform spaced apart from the floor level. According to at least one embodiment, the package computer controlled vehicle deposits the package at a lift of the second function sorting system.

According to at least one embodiment, the second function sorting system comprises one or more of a: conveyorized device, robotic arm sorter, tilt tray sorter, sweep sorter, activated roller sorter, cross belt sorter, split tray sorter, track-type sorter, chute, lift, elevator, autonomous mobile robot (AMR), gantry crane, rail-based equipment, automated guided vehicle (AGV), and self-propelled first destination container. According to at least one embodiment, the automated packaging device is further configured to print indicia to the package, wherein the indicia identify one or more of: a customer order associated with the package, a store associated with the package, a delivery address associated with the package, and a business associated with the package.

According to at least one embodiment, the order fulfillment system also includes a package transfer system configured to direct a computer-controlled conveyance mechanism to transfer the package from the automated packaging device for delivery to a second function sorting system. According to at least one embodiment, the computer-controlled conveyance mechanism comprises a robotic arm configured to transfer the package to one or more of a: conveyor system, shuttle, AGV, and robotic vehicle, for delivery to the second function sorting system.

According to at least one embodiment, the order fulfillment system also includes a receptacle exchanger. The receptacle exchanger may include: a shelf comprising a plurality of storage locations arranged in one or more levels; and, a frame positioned adjacent the shelf, the frame comprising a lift configured for transferring the receptacle to a storage location of the shelf, wherein the system is configured to direct, by a receptacle exchange engine, the lift to transfer the receptacle from a storage location of the shelf to an article receiving position. According to one embodiment, the order fulfillment system is further configured to operate the storage location of the shelf as a buffering storage place for one or more of a: completed order receptacle, full receptacle, and empty receptacle. According to one embodiment, the order fulfillment system is further configured to direct the lift to transfer a complete order receptacle from the article receiving position to the storage location of the shelf. According to one embodiment, the order fulfillment system is further configured to direct the lift to transfer a full receptacle from the article receiving position to the storage location of the shelf. According to one embodiment, the order fulfillment system is further configured to a complete order receptacle from the article receiving position onto a receptacle transport device for transporting to a location of further processing. According to one embodiment, the order fulfillment system is further configured to transfer a full receptacle from the article receiving position onto a receptacle transport device for transporting to a location of further processing. According to one embodiment, the order fulfillment system is further configured to direct the lift to transfer an empty receptacle from a position about a receptacle transport device to the storage location of the shelf. According to one embodiment, the order fulfillment system is further configured to direct the lift to transfer the receptacle from a storage location of the shelf to a receptacle transport device, wherein the receptacle transport device transports the receptacle to a location of further processing.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems, and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 15 depicts a flowchart of an exemplary implementation of an improved system for use in directing an order fulfillment operation, for e.g., in a centralized or localized sorting facility, according to one or more implementations of the presently disclosed subject matter.

FIG. 16 depicts a flowchart of an exemplary implementation of an improved system for use in directing an order fulfillment operation, for e.g., in a centralized or localized sorting facility, according to one or more implementations of the presently disclosed subject matter.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different con-figurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

Centralized fulfillment of customer orders is becoming ubiquitous with more and more businesses opting for semi-automated or substantially automated filling operations to achieve economies of scale and to improve the overall efficiency of order fulfillment. However, as noted earlier, technical challenges exist in pairing the ideal permutations and combinations of technological solutions for the sorting process and the dispatching process that can be coupled with the ASRS equipment, while considering the array of article quantities and types that are to be used to fill customer orders and store replenishment requirements.

Embodiments of the presently disclosed subject matter advantageously overcome the limitations of the art by providing for systems, apparatus and processes that enable an automated for fulfillment system to optimize a combination of automation technologies to minimize cost and time requirements while utilizing available space and equipment capacity and can efficiently dispatch receptacles carrying ordered articles to an automated packing station for packout in an optimal manner.

Figure 1:
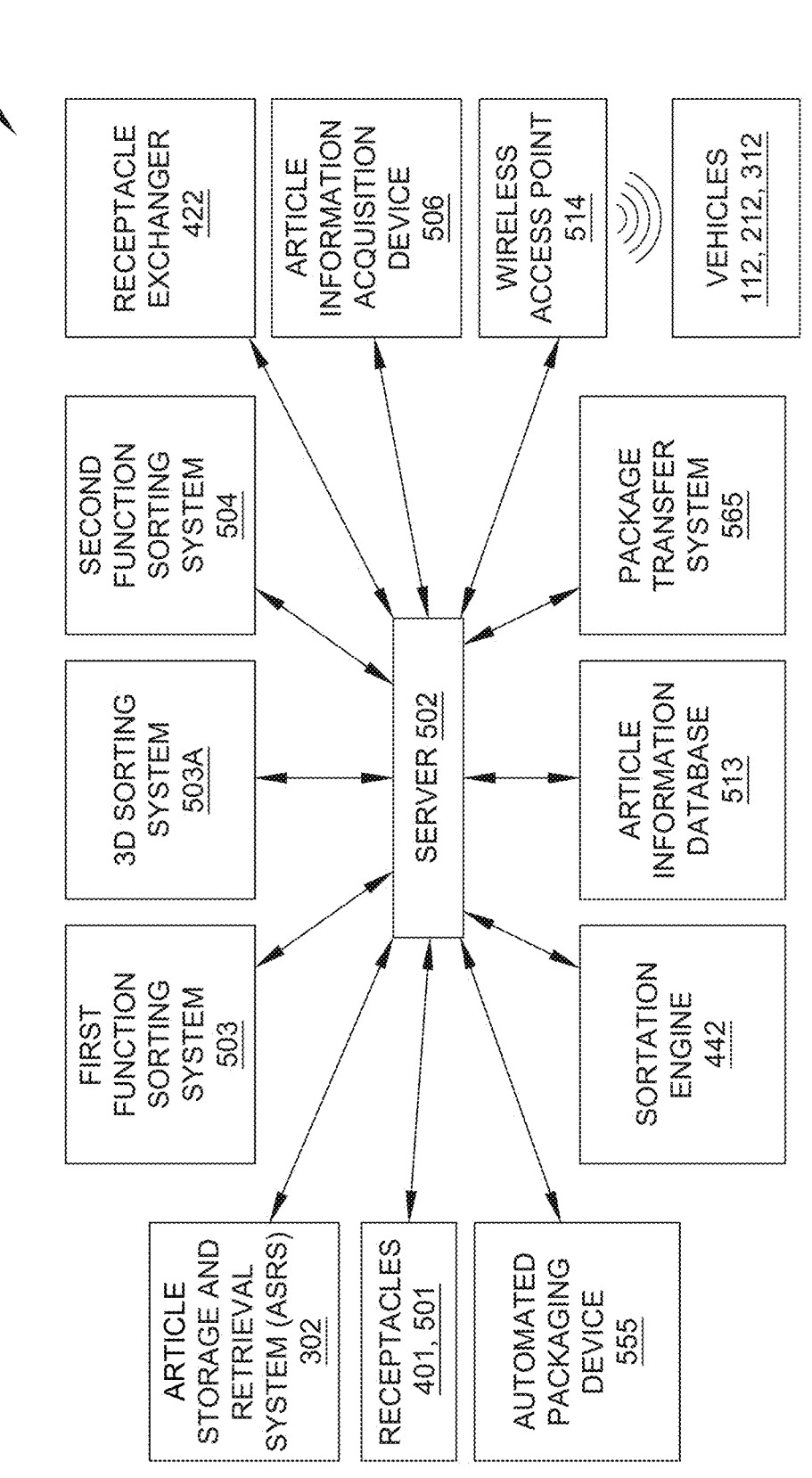
FIG. 1 depicts a block diagram of an exemplary improved order fulfillment system that includes an article storage and retrieval system (ASRS) and one or more order sortation systems, according to one or more implementations of the presently disclosed subject matter.

According to various embodiments of the disclosed subject matter, provided herein are systems, methods, and apparatus for directing, managing, and controlling order fulfillment and packout in a centralized or localized operation. According to at least one embodiment, as shown in FIG. 1, an order fulfillment system such as order fulfillment system 500 (may hereinafter be alternately referred to as "system 500" or just "system") comprises, among others, a control server such as server 502 (server 502 may alternately be referred generically as "server," or "controller"). Server 502 comprises a memory, a processor; server 502 may further include or may otherwise be in communication with an article and package information database such as article information database 513, and a sortation engine 442. Sortation engine 442 may comprise a receptacle exchange engine. System 500 further comprises an article storage and retrieval system (ASRS) 302, and a first function sorting system 503. ASRS 302 comprises articles stored in storage bins 332 for retrieval by retrieval mechanism 306. First function sorting system 503 operates to sort items such as articles 20 to orders or to destination containers such as first function sort receptacles 401 using computer-controlled transport vehicles. System 500 further comprises a sortation engine 442 performing receptacle assignment associated with order fulfillment, at least one wireless access point 514, and a plurality of computer-controlled transport vehicles such as first function vehicles 112, second function vehicles 212, and receptacle transport vehicles 312. In at least one embodiment, system 500 further comprises an automated packaging device 555, a package transfer system 565, second function sorting system 504, article information acquisition device 506, receptacle exchanger 422, and a plurality of receptacles such as, for example, first function sort receptacles 401. In one embodiment, each first function sort receptacles 401 corresponds to a customer order wherein server 502 associates each first function sort receptacles 401 with a respective customer order. In at least one embodiment, server 502 (i.e., the "controller") comprises two or more constituent controllers-a first controller such as an automated storage and retrieval system (ASRS) controller and a second controller such as a sortation controller in addition to separate controllers for controlling all other sub-systems of system 500.

Figure 2:
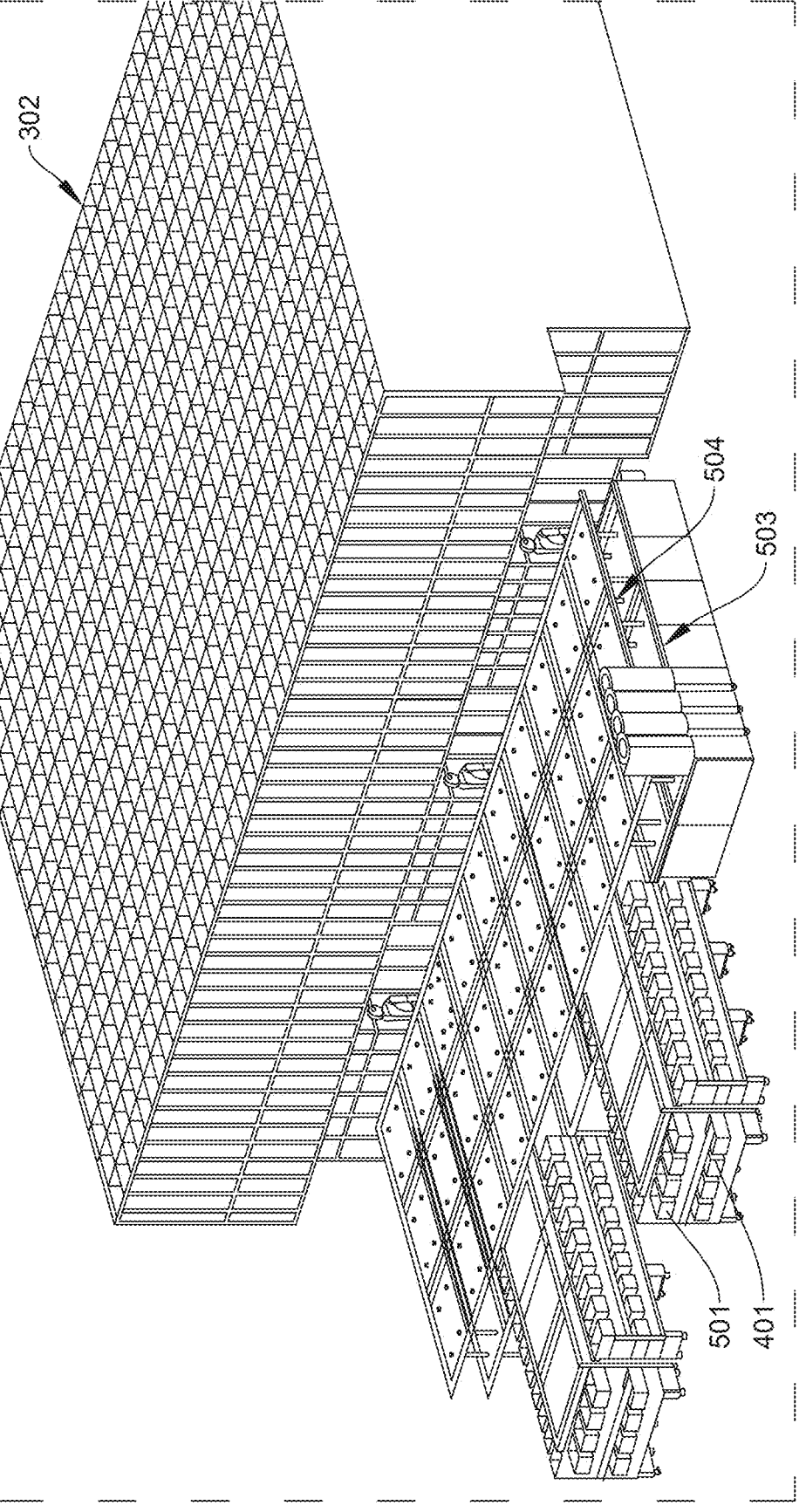
FIG. 2 illustrates a side perspective view of an example implementation of the system of FIG. 1 that comprises an ASRS and an order sortation system comprising first and second platforms, according to one or more implementations of the presently disclosed subject matter.
Figure 3:
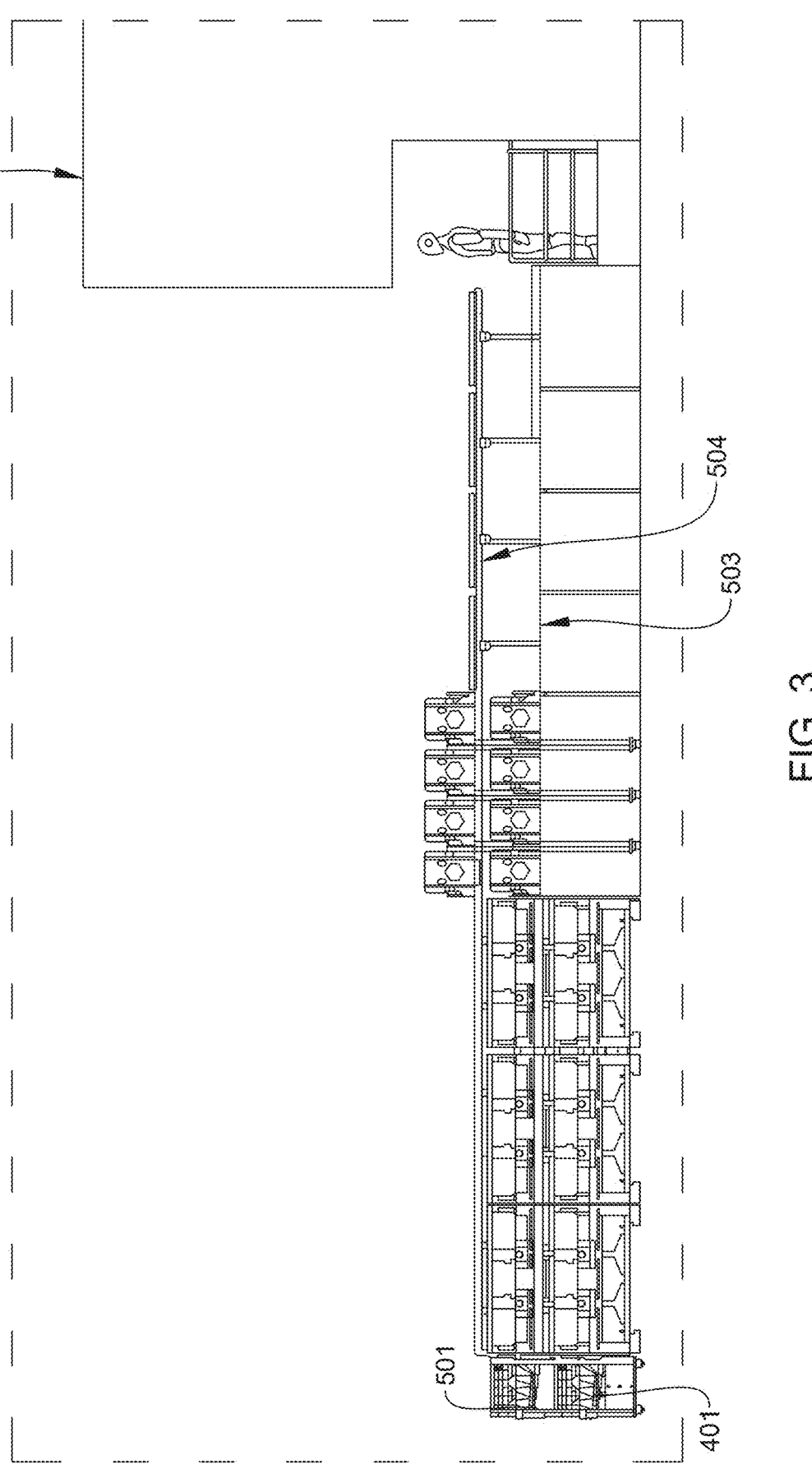
FIG. 3 illustrates a side profile view of the system of FIG. 2, according to at least one embodiment of the presently disclosed subject matter.
Figure 4:
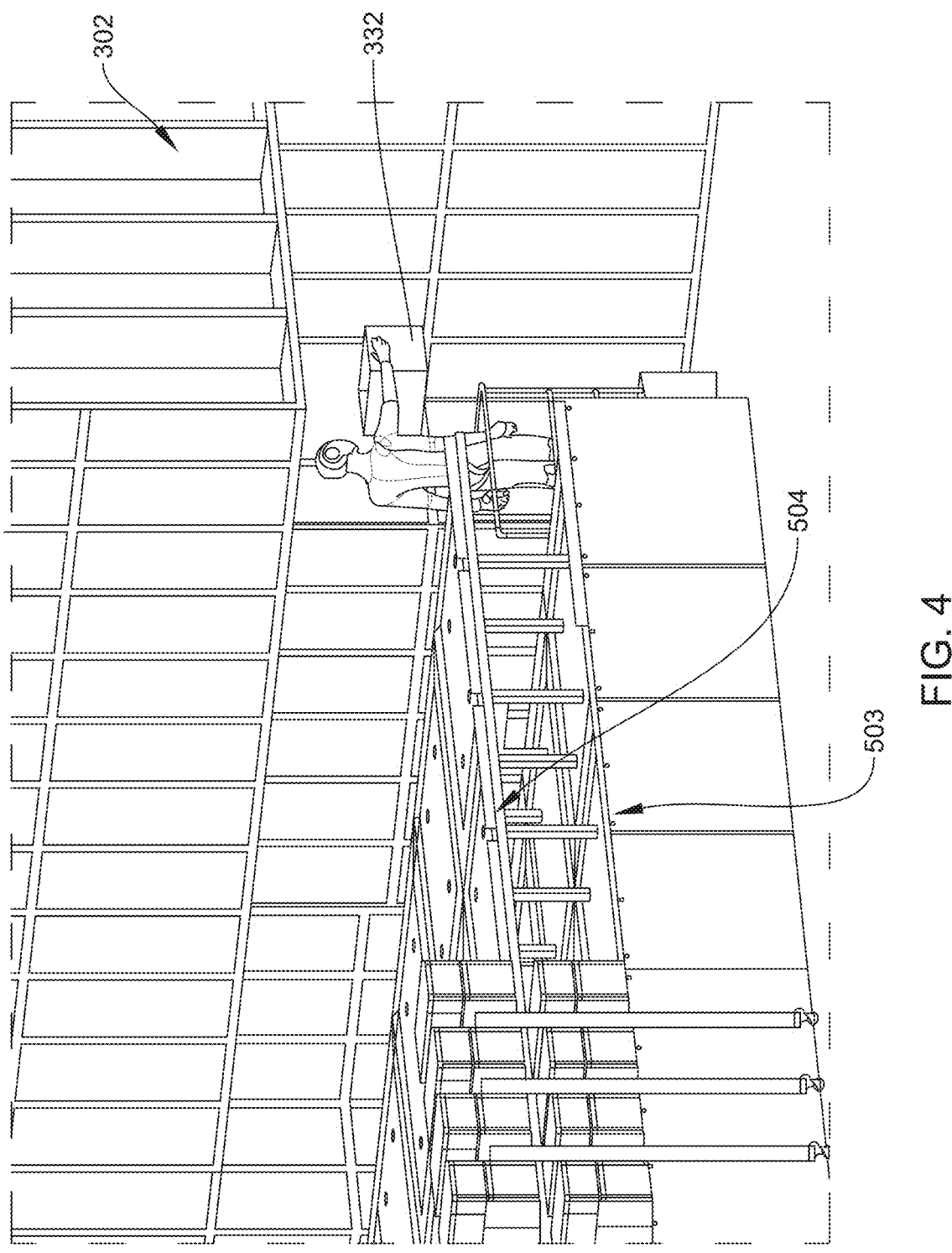
FIG. 4 illustrates a side perspective view of a portion of the system of FIG. 2 with a storage bin being handled by a human or a humanoid, according to at least one embodiment of the presently disclosed subject matter.
Figure 5:
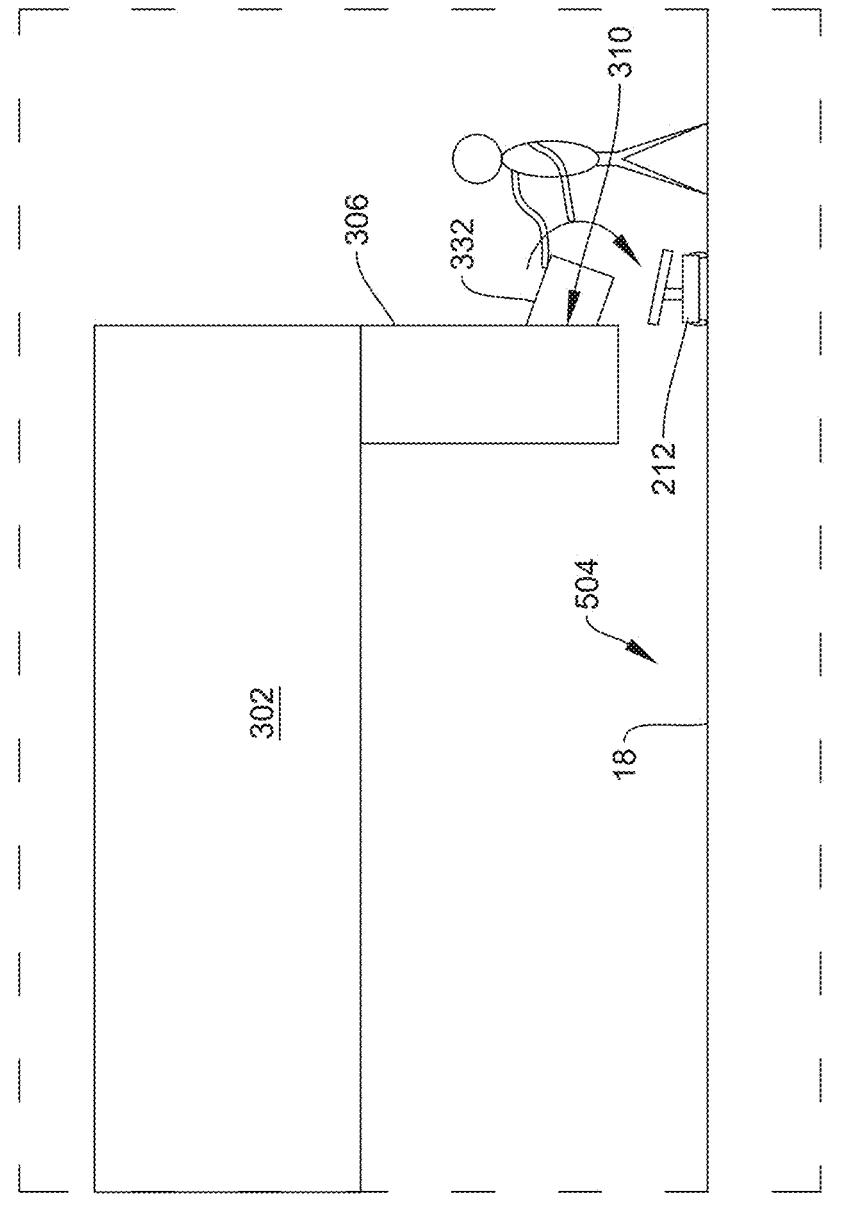
FIG. 5 illustrates a side profile view of a portion of the system of FIG. 1, with a storage bin being handled by a human or a humanoid, according to at least one embodiment of the presently disclosed subject matter.
Figure 6:
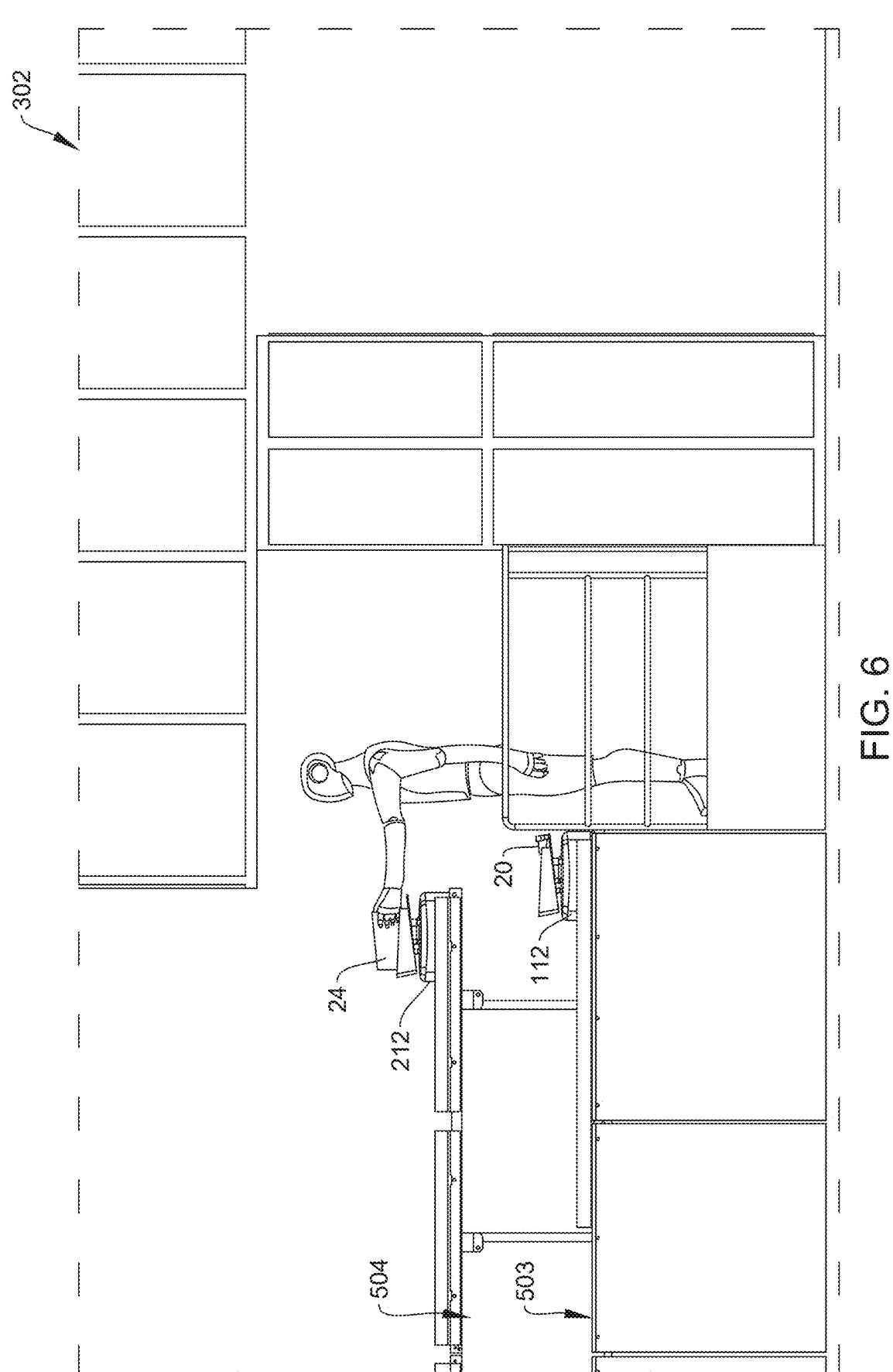
FIG. 6 illustrates a side profile view of a portion of the system of FIG. 2 with an item such as an article or a package being loaded by a human or a humanoid onto an article computer controlled vehicle, according to at least one embodiment of the presently disclosed subject matter.
Figure 7:
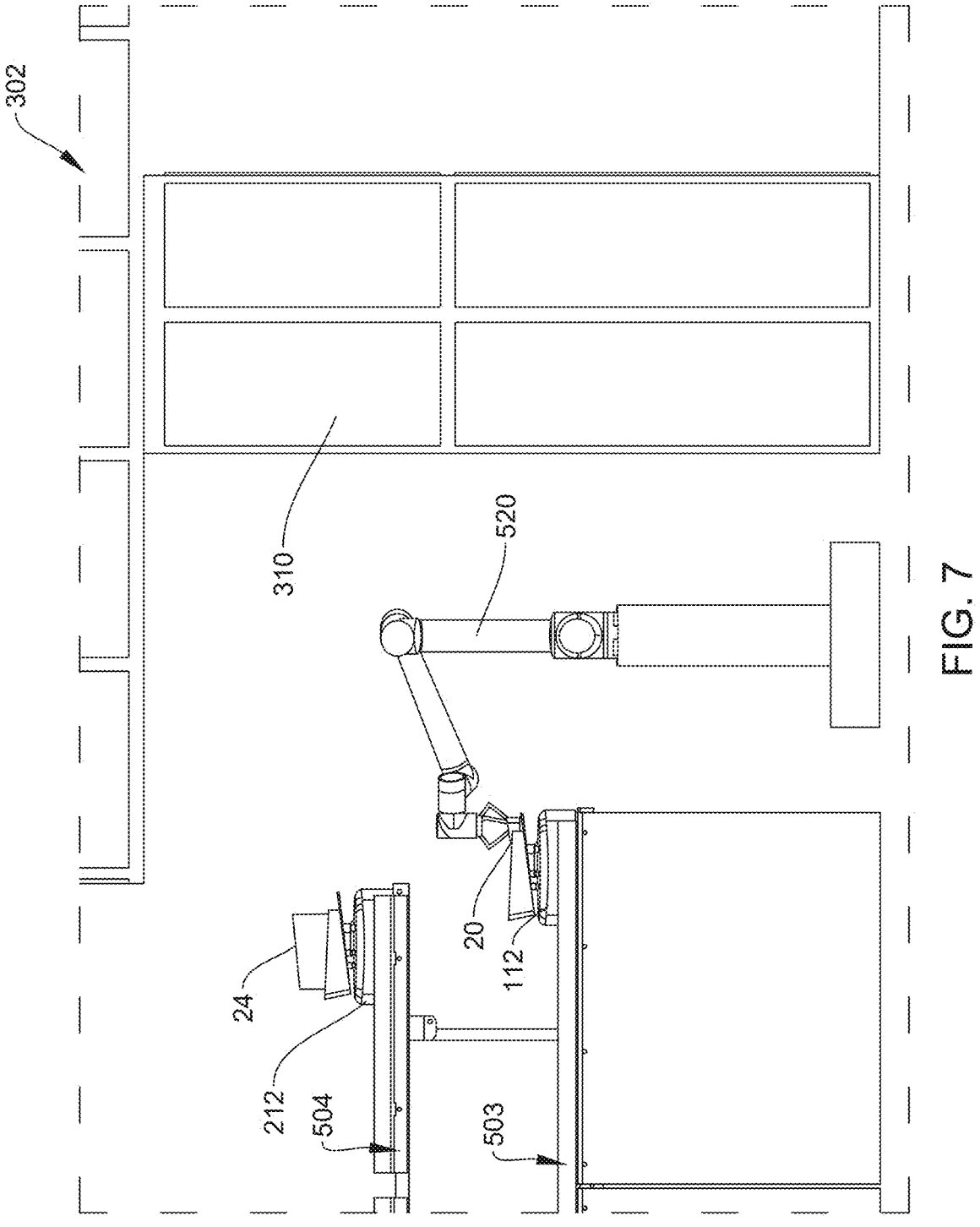
FIG. 7 illustrates a side profile view of a portion of the order fulfillment system of FIG. 1 with an item such as an article or a package being loaded by a robotic arm onto an article computer controlled vehicle, according to at least one embodiment of the presently disclosed subject matter.
Figure 8:
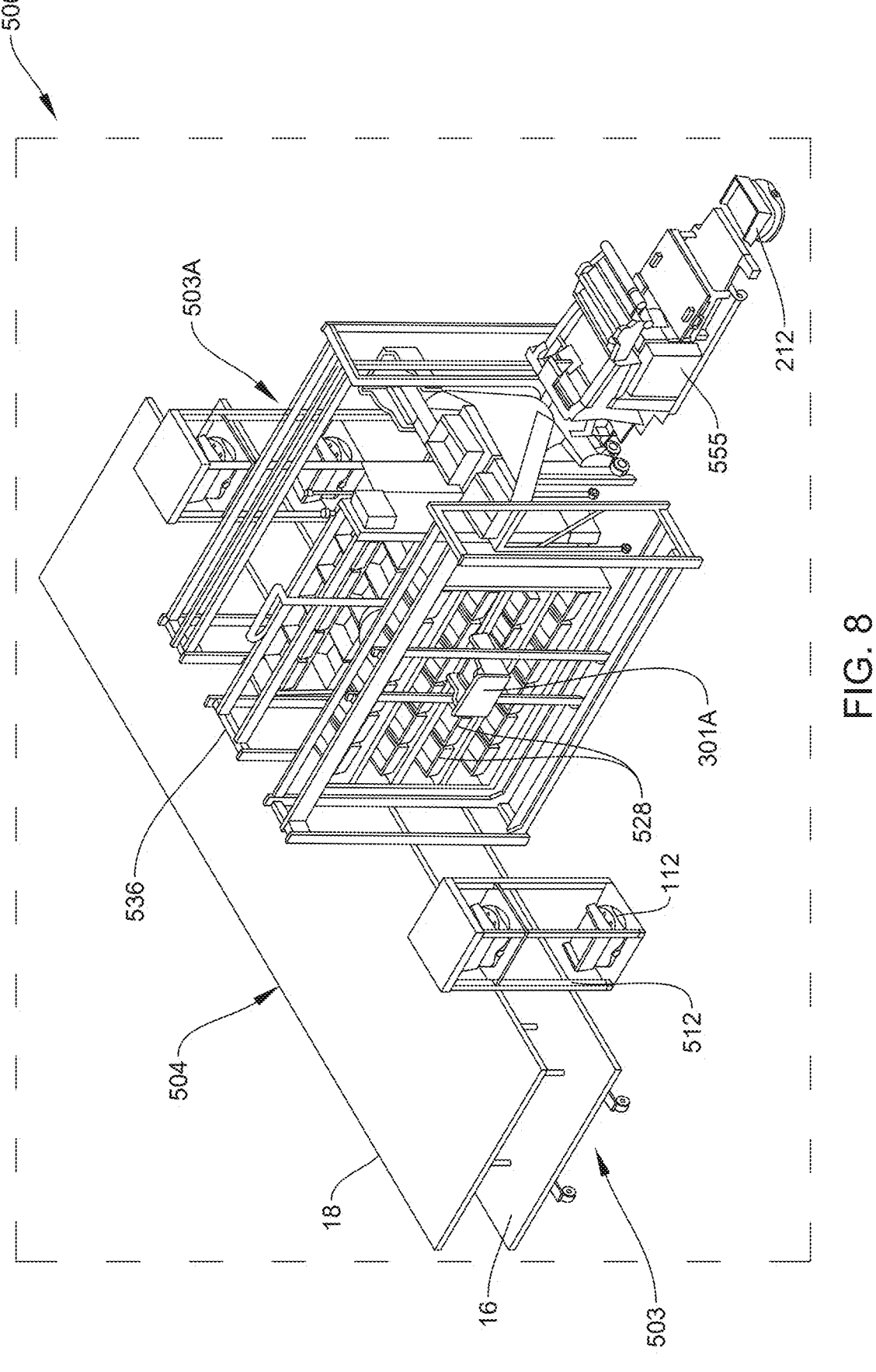
FIG. 8 illustrates a front side perspective view of a portion of the order fulfillment system of FIG. 1 that comprises a 3D sorting system comprising sort shelf banks providing enhanced sorting capability and an automated packaging device, according to one or more implementations of the presently disclosed subject matter.
Figure 9:
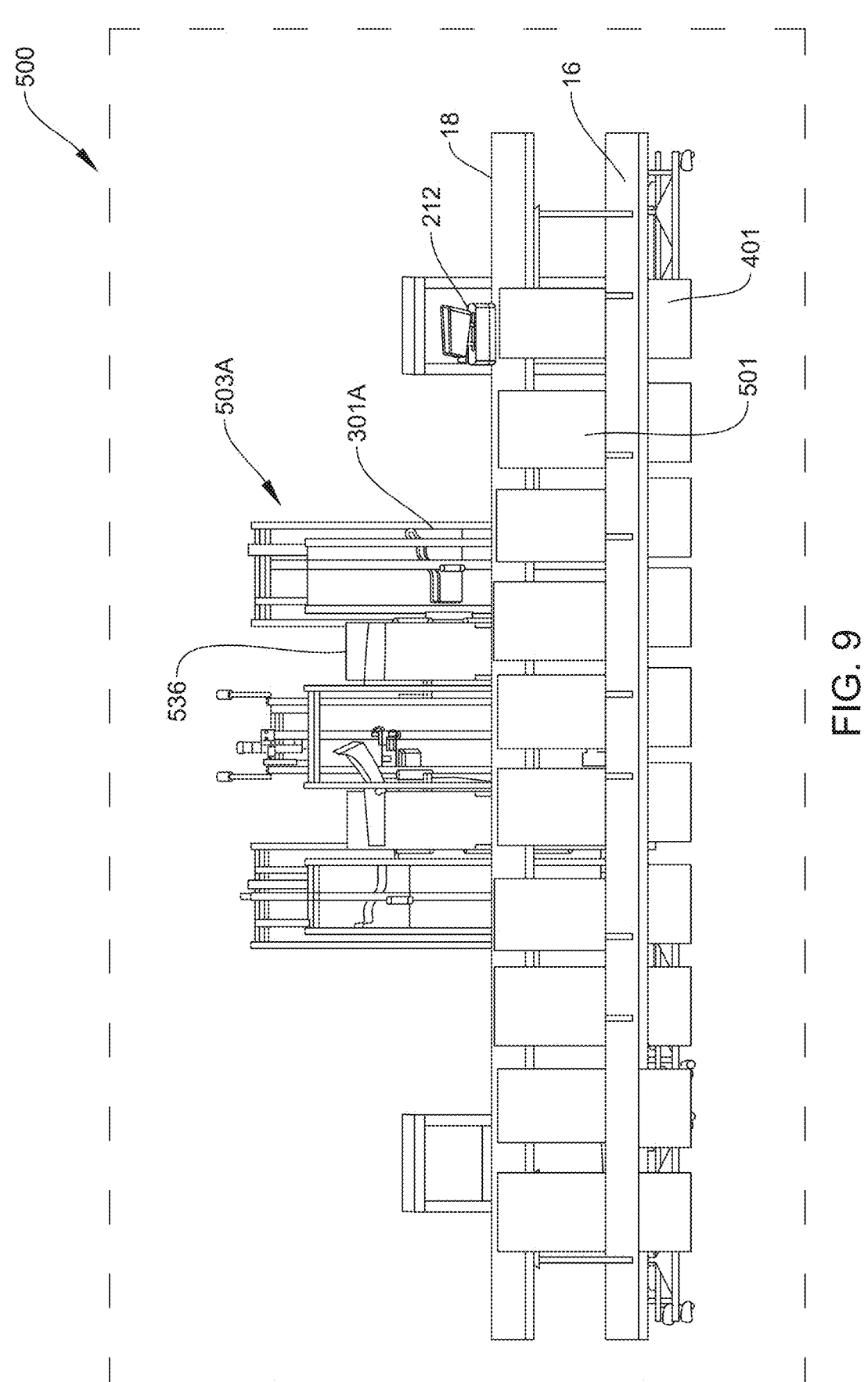
FIG. 9 illustrates a rear profile view of the system of FIG. 8, according to at least one embodiment of the presently disclosed subject matter.
Figure 10:
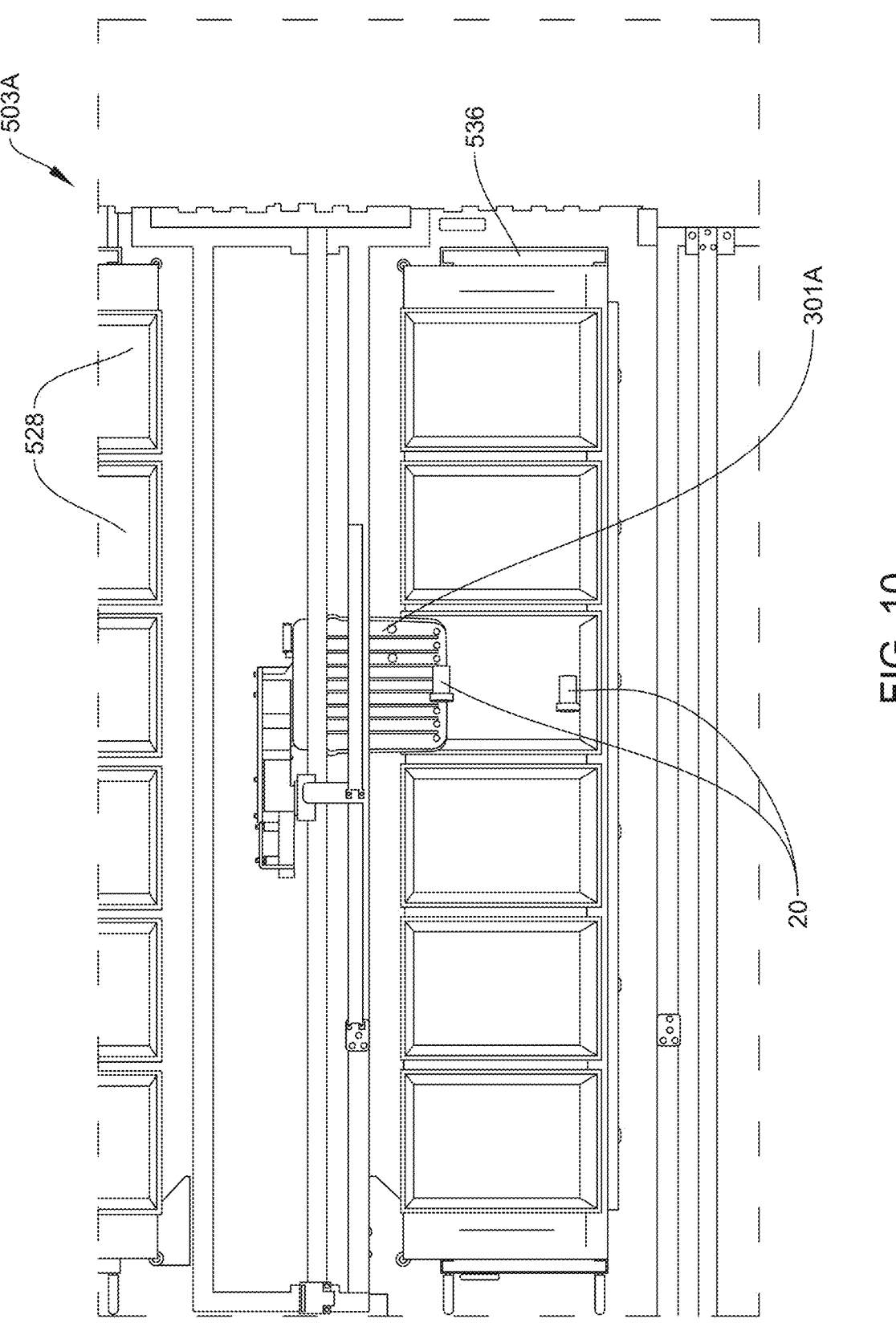
FIG. 10 illustrates a top schematic view of a portion of the 3D sorting system of FIG. 8, according to at least one embodiment of the presently disclosed subject matter.
Figure 11:
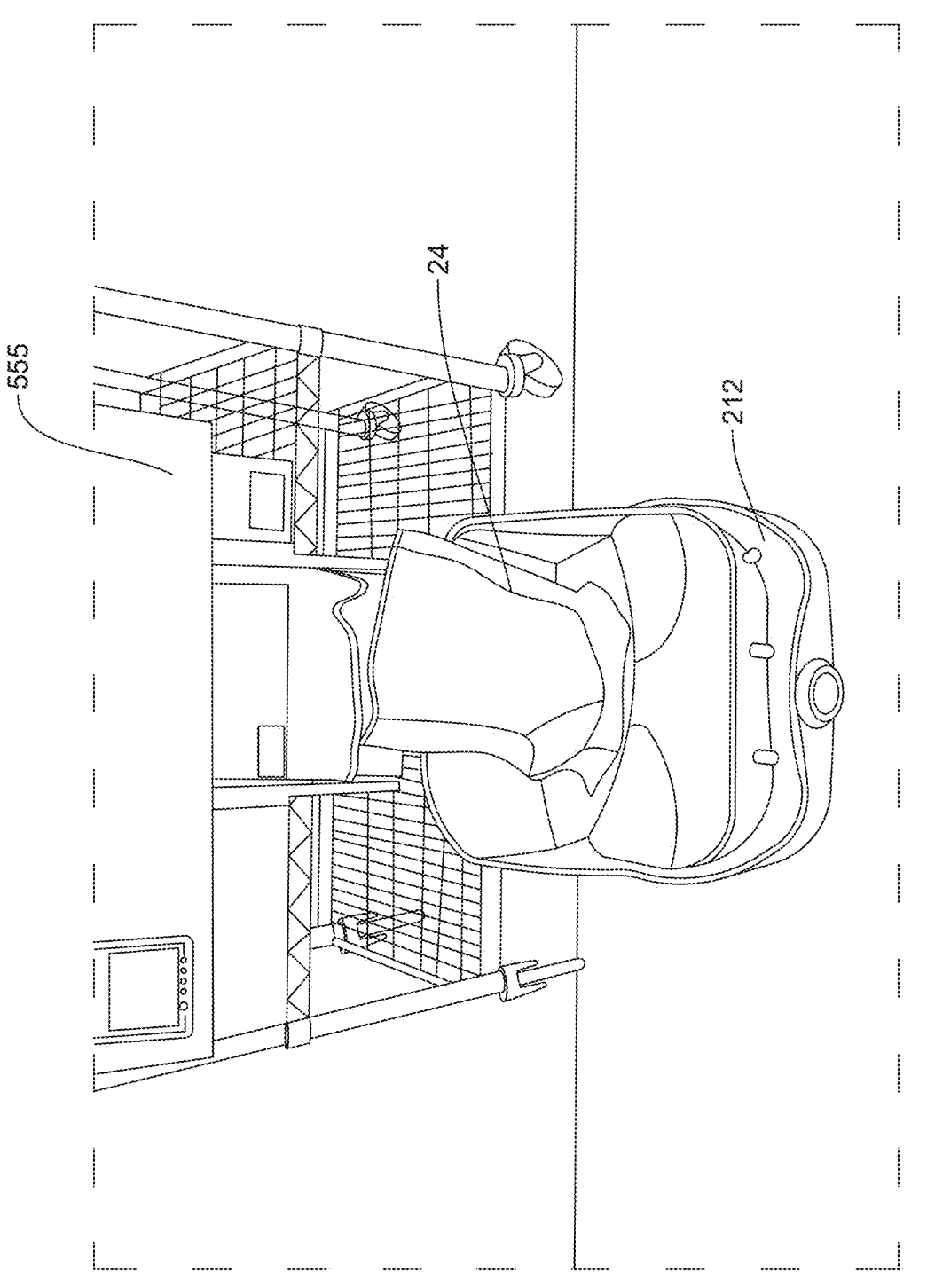
FIG. 11 illustrates a perspective view of a portion of the order fulfillment system of FIG. 1 that shows a package being output from an automated packaging device, according to at least one embodiment of the presently disclosed subject matter.
Figure 12:
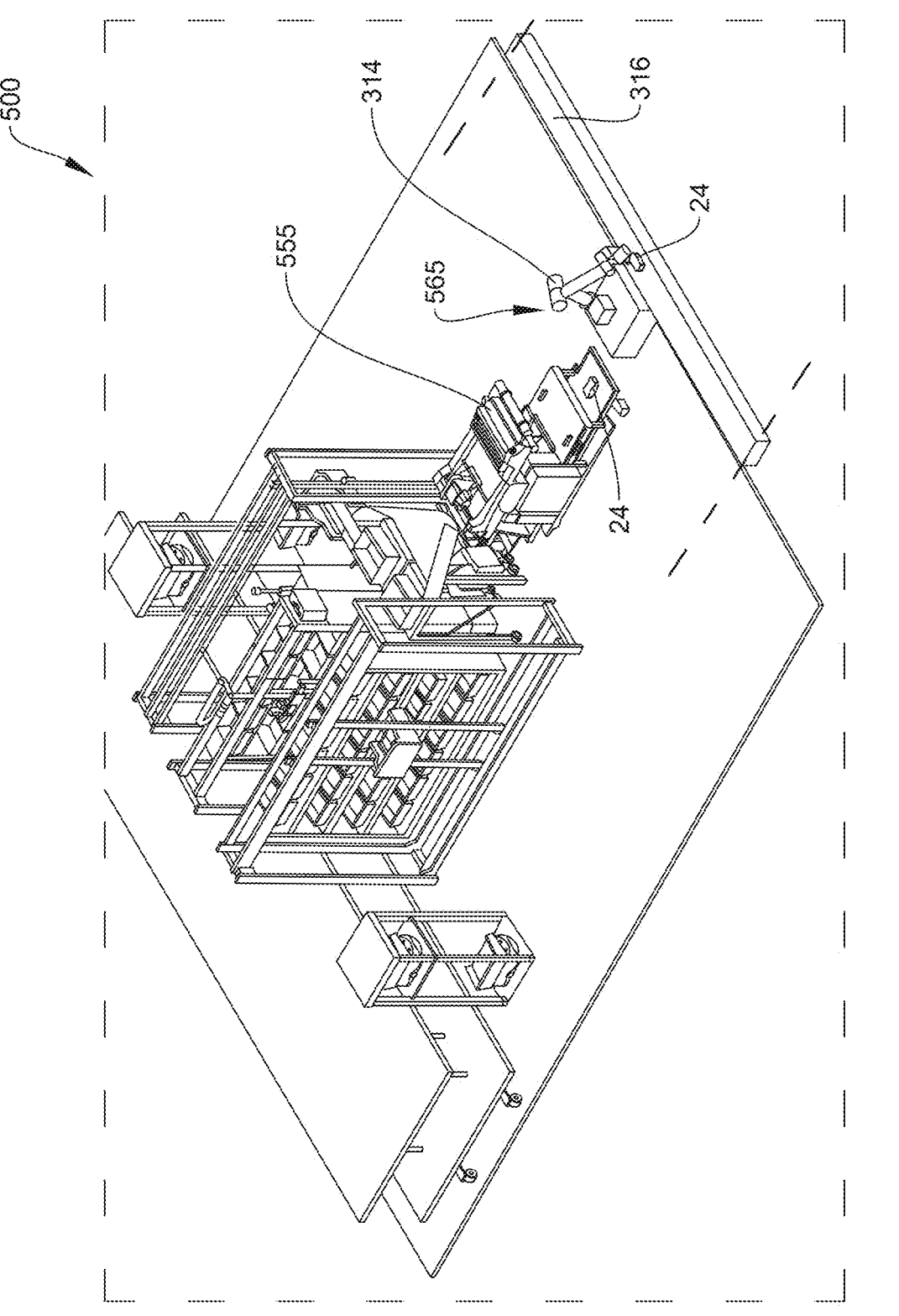
FIG. 12 illustrates a side perspective view of a portion of the system of FIG. 1 that comprises a package transfer system including a robotic arm transferring packages, for example, onto a conveyor system, according to at least one embodiment of the presently disclosed subject matter.
Figure 13:
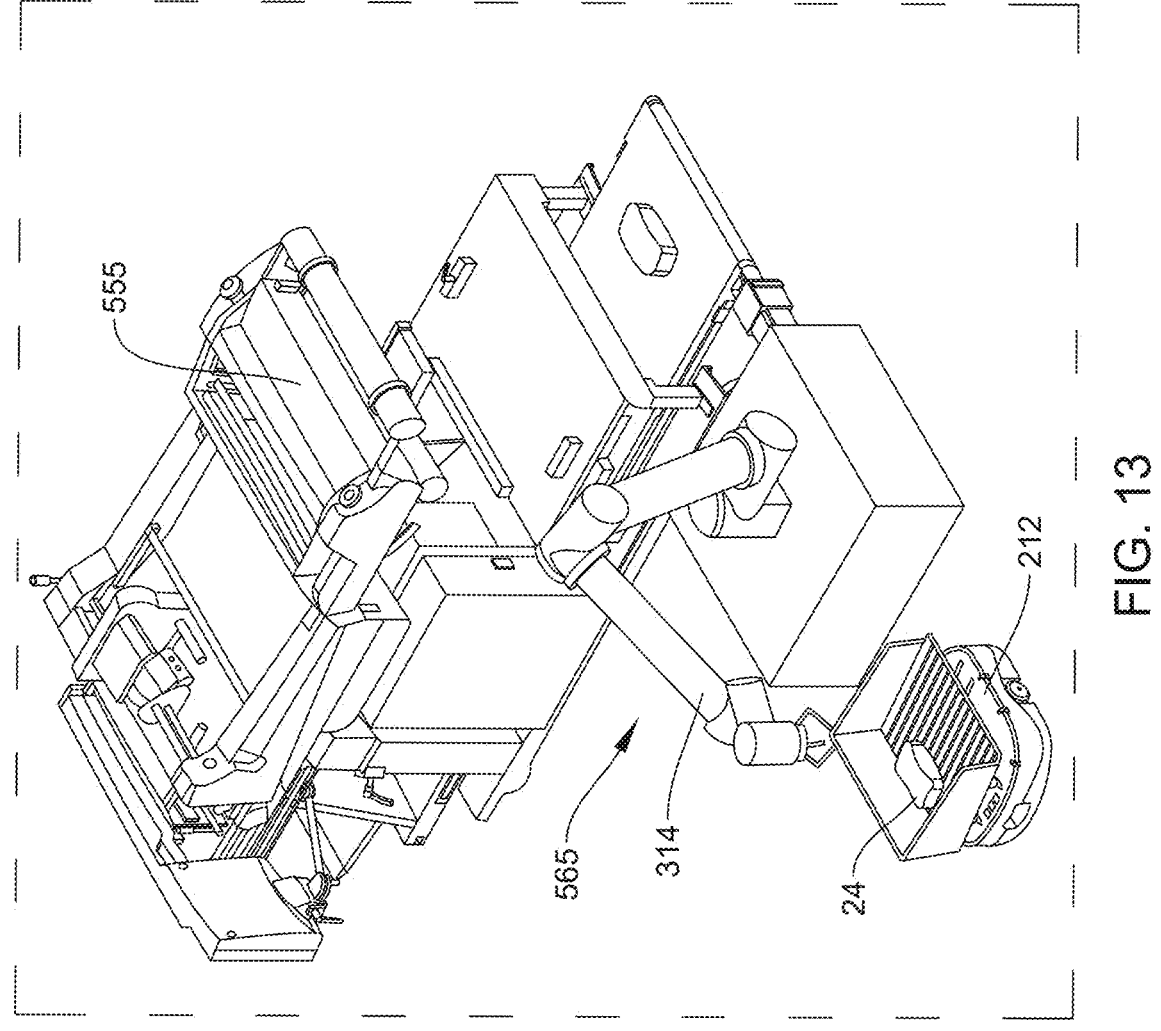
FIG. 13 illustrates a side perspective view of a portion of the system of FIG. 1 that comprises a package transfer system including a robotic arm transferring packages onto a computer controlled vehicle, according to at least one embodiment of the presently disclosed subject matter.

According to various embodiments, as illustrated, for example, in FIG. 2, ASRS 302 comprises a three-dimensional array of storage spaces from which the articles 20 to be sorted are automatically retrievable by one or more retrieval mechanisms 306 in response to commands. According to at least one embodiment, the retrieval mechanism 306 further comprises a lift for transferring the first article 20 from the storage bin 332 to an output station 310 of ASRS 302 for induction onto the first function vehicle 112 or to a position directly about a first function vehicle 112. In various embodiments, the controller, or server 502 that the controller forms part of, is configured to: direct the retrieval mechanism 306 of ASRS 302 to move a storage bin 332 containing an article 20 to an output station 310. The controller is further configured to direct the induction of the article 20 onto a first function vehicle 112. In some embodiments, as shown in FIG. 6, a human or humanoid may pick an article 20 from the storage bin 332 (that has been transferred by the retrieval mechanism 306 to the output station 310) and induct such article 20 onto a first function vehicle 112. In some embodiments, as shown in FIG. 7, a transfer robot 520 in communication with the controller or with server 502 may pick an article 20 from the storage bin 332 (that has been transferred by the retrieval mechanism 306 to the output station 310) and induct such article 20 onto a first function vehicle 112. In some embodiments, storage bin 332 is transferred, carried, conveyed, moved, shifted, or relocated to an output station 310 by retrieval mechanism 306 comprising one of: a cable trolley, a shuttle robot traveling on a railing, and an elevator. According to at least one embodiment, the retrieval mechanism 306 further comprises a lift to transfer a first article 20 from the storage bin 332 to a position about the article 20. The controller is further configured to direct the first function vehicle 112 to transport and deposit the article 20 collected from the storage bin 332 at the output station 310 into a first function sort receptacle 401. According to at least one embodiment, the retrieval mechanism further comprises a lift to transfer the first article 20 from the storage bin 332 to the output station 310.

In various embodiments, ASRS 302 is positioned juxtaposed right next to the first function sorting system 503 such that a footprint occupied by the first function sorting system 503 is adjacent to, or otherwise coincides with or even partially overlaps with, the footprint occupied by the ASRS 302. In other words, in at least one embodiment, there is minimal to no space provided between the footprints of ASRS 302 and first function sorting system 503. In at least one embodiment, a vertical projection of a footprint of the of ASRS 302 is spaced apart by 0, 1, 2, 3, 4, 5, 10, 15 or 20 feet from a vertical projection of a footprint of first function sorting system 503. In one embodiment, at least a portion of a footprint of ASRS 302 extends over a footprint of the first function sorting system 503, as illustrated, for example, in FIG. 2. In at least one embodiment, a portion of ASRS 302 is arranged above the first function sorting system 503 in a vertically stacked configuration such that at least 1% of a vertical projection of a footprint of the first function sorting system 503 is accommodated within a vertical projection of a footprint of ASRS 302. In one embodiment, a whole footprint of first function sorting system 503 is fully and completely accommodated within a footprint of ASRS 302; stated differently, a vertical projection of first function sorting system 503 is accommodated 100% within the vertical projection of ASRS 302. This arrangement may advantageously allow for the improved utilization of limited floor space availability.

In various embodiments, ASRS 302 is thus advantageously positioned right next to, or juxtaposed to, a sorting system such as first function sorting system 503 with no intervening conveyors or AMRs required (or provided) to transfer an article retrieved from the ASRS 302 to first function sorting system 503. The positioning of the ASRS 302 adjacent to the first function sorting system 503 advantageously prevents the need for including an additional set of floor running robots for transferring articles 20 retrieved from the ASRS 302 to the first function sorting system 503. The positioning of the ASRS 302 adjacent to the first function sorting system 503 also advantageously prevents the need for including a conveyor system between ASRS 302 and first function sorting system 503 for transferring articles 20 retrieved from the ASRS 302 to the first function sorting system 503. The positioning of the ASRS 302 adjacent to the first function sorting system 503 accordingly advantageously prevents the capital investment requirements and the space requirements that would otherwise be required for transferring articles 20 retrieved from the ASRS 302 to the first function sorting system 503.

According to embodiments disclosed herein, output station 310 forming part of ASRS 302 is positioned on top of, right next to, or adjacent to and induction point of first function sorting system 503. This set up advantageously allows for the induction of an article 20 from a storage bin 332 (that has been transferred by the retrieval mechanism 306 to the output station 310) onto a first function vehicle 112 by a transfer robot 520, human or humanoid. Thus, in one embodiment, an automated transfer mechanism such as, for example, a robotic arm operates to transfer an article 20 present at output station 310 onto a first function vehicle 112 of the first function sorting system 503. In one embodiment, output station 310 operates as a physical bridge connecting ASRS 302 to the first function sorting system 503.

According to one embodiment, articles retrieved from ASRS 302 are delivered directly to an induction station of first function sorting system 503. According to this embodiment, a storage bin 332 containing the article 20 to be retrieved from to be transferred, carried, conveyed, moved, shifted, or relocated to an induction station by retrieval mechanism 306. Retrieval mechanism 306 may comprise one or more of: a cable trolley, a shuttle robot traveling on a railing, and an elevator. In one embodiment, ASRS 302 is provided with one or more elevators through which storage bin 332 is transferred to output station 310 or to the induction station of first function sorting system 503. One embodiment relies on one or more transfer robots 520 to assist in the transfer of articles from output stations 310 of ASRS 302 to input stations of the first function sorting system 503. According to one embodiment, transfer robot 520 comprises a six-axis robotic arm with an end effector to move items from output stations of ASRS 302 to an input station of the first function sorting system 503. In at least one embodiment, ASRS 302 may have same or similar features as generally described in U.S. Pat. No. 12,330,875 B1 filed by Tompkins Robotics, Inc., which is hereby incorporated herein by reference in its entirety. In one embodiment, ASRS 302 is a standalone system from a first manufacturer (such as, for e.g., the Ocado Group or Autostore™) and the first function sorting system 503 is a standalone system from a second manufacturer (such as Tompkins Robotics, Inc.), such that the second manufacturer is different and independent from the first manufacturer.

In various embodiments, first function sorting system 503 operates to sort articles to destinations. In various embodiments, first function sorting system 503 comprises one or more computer controlled vehicles such as first function vehicles 112 traveling on a first function platform 16 raised from a surface for transporting and depositing articles to be sorted such as articles 20 into a plurality of receptacles such as first function sort receptacles 401 in response to commands. In one embodiment, server 502 (also referred to herein as the "controller") is in communication with sortation engine 442 in order to determine a specific first function sort receptacle 401 among a plurality of first function sort receptacles 401 to deliver, with a first function vehicle 112, an article 20 based on a destination determined for the article 20 as determined from sortation engine 442. According to one or more embodiments, a sortation controller (forming part of server 502) for use with material handling of a plurality of articles includes a memory and a processor. The sortation controller is configured to receive a plurality of orders for a plurality of disparate articles, batch the plurality of orders over a period of time, interact with an identifier affixed to an article 20 or packaging associated with the article 20 in order to determine a characteristics of the article 20, determine one first function sort receptacle 401 of a plurality of first function sort receptacles 401 to deposit, with a first function vehicle 112, a selected article 20, wherein the destination receptacle is determined based on at least one order and the determined characteristic of the selected article 20. According to one or more embodiments, each first function vehicle 112 has a first position in which an article 20 is stowed about the first function vehicle 112 and a second position in which the article 20 is deposited into a proximal first function sort receptacles 401. In at least one embodiment, each first function vehicle 112 is configured for traveling in all directions on a platform to transport and deposit an article 20, i.e., the first function vehicle 112 is not configured to travel along a set path or route; by contrast, in one alternate embodiment, each first function vehicle 112 is configured for traveling along one or more specific or predetermined paths or routes on a platform to transport and deposit an article 20. In various embodiments, first function sorting system 503 may have same or similar features as generally described in U.S. Pat. Nos. 9,975,148 B2, 11,759,826 B1, and 12,186,780 B2, which are hereby incorporated herein by reference in their entireties.

According to at least one embodiment, the controller (i.e., server 502) is configured to: receive an order for a plurality of disparate articles. The controller may then direct retrieval mechanism 306 of ASRS 302 to move a storage bin 332 containing a first article required for the order to an output station 310 or to an induction station of first function sorting system 503. The controller may further determine a first function sort receptacles 401 among a plurality of first function sort receptacles 401 to deliver, with a first function vehicle 112, the first article 20 based on a destination determined for the first article 20. The controller may further direct collecting, at the output station 310, of the first article 20 from the storage bin 332. The controller is further configured to direct first function vehicle 112 to transport the first article 20 for sorting the first article 20 into the first function sort receptacles 401, wherein the first function sort receptacles 401 corresponds with an order. The controller is further configured to determine when the order (e.g., a customer order, a store order, a zip code order) is complete.

According to at least one embodiment, an output of the first function sorting system 503 is provided as an input to one or more of a: chute, lift, elevator, shoe sorter, conveyor, robotic arm, track-type sorter, gantry crane, gantry crane moveably coupled to a AMR, autonomous mobile robot (AMR), rail-based equipment, gantry crane, gantry crane moveably coupled to an AMR, rail-based equipment, automated guided vehicle (AGV), conveyorized device, self-propelled receptacle, elevator, and a computer controlled vehicle.

In at least one embodiment, an order sortation system of system 500 comprises two sorting sub-systems, namely first function sorting system 503 and second function sorting system 504. In an alternate embodiment, an order sortation system of system 500 comprises three sorting sub-systems, namely first function sorting system 503, 3D sorting system 503A, and second function sorting system 504.

According to at least one embodiment, system 500 further comprises an automated packaging device 555. Automated packaging device 555 is configured to: receive one or more sorted articles 20 through an opening of a repository of the automated packaging device 555 and seal the repository to form a package 24. According to at least one embodiment, the automated packaging device 555 is further configured to print indicia to the package 24. In various embodiments, the indicia may identify one or more of: a customer order associated with the package 24, a store associated with the package 24, a delivery address associated with the package 24, and a business associated with the package 24.

According to at least one embodiment, system 500 further comprises a 3D (three-dimensional) sorting system 503A. In at least one embodiment, 3D sorting system comprises two shelves 536. Each shelf 536 may be composed of a plurality of storage locations 528 vertically arranged on the shelf. Each storage location 528 is configured to accept therein an article receptacle. The 3D sorting system 503A further comprises an article lift 301A translating along three axes about a conveying rail frame, the conveying rail frame arranged between the two shelves and parallel to at least one of the two shelves, the article lift 301A configured to sort an article received at the article lift 301A to one of an article receptacle located at one of the plurality of storage locations of a shelf responsive to instructions received from the controller. According to at least one embodiment, an output of the first function sorting system 503 is provided as an input to the 3D sorting system 503A.

According to at least one embodiment, an output of 3D sorting system 503A is provided as an input to automated packaging device 555. Furthermore, a package 24 output by the automated packaging device 555 is provided as an input to second function sorting system 504. According to at least one embodiment, 3D sorting system 503A forms a component or sub-part of first function sorting system 503. According to at least one embodiment, an output of the first function sorting system 503 is provided as an input to an article lift 301A of a 3D sorting system for delivery to the automated packaging device 555. In some embodiments, the articles 20 sorted by first function sorting system 503, and optionally further by 3D sorting system 503A, are conveyed to automated packaging device 555 that packages all articles 20 associated with an order are sealed within a package 24. The automated packaging device 555 operates to chooses an appropriate box size, adding packing material, and sealing it-then printing and applying a shipping label with the customer's address.

In one embodiment, 3D sorting system 503A further includes a tote tilter capable of tilting totes that operates as a transition point to which the entire contents of assigned or completed storage location 528 is deposited into, for example, by article lift 301A. After such deposition of all articles contained in the assigned storage location 528 or the completed order storage location 528 into the tote tilter, the tote tilter tilts in a manner that causes all articles present in the tote tilter (that were previously transferred into it from storage location 528) are deposited into a bagging inlet 30 of automated packaging device 555. In one embodiment, 3D sorting system 503A or system 500 is further configured to determine when the automated packaging device 555 is ready for the tote tilter to empty out the one or more articles present in a storage location 528 of the 3D sorting system 503A into a bagging inlet of the automated packaging device 555. In one embodiment, a tote tilter accordingly operates to empty one or more articles out of a "completed order" storage location 528 into a bagging inlet of automated packaging device 555. In one embodiment, the tote tilter is positioned between the 3D sorting system 503A and the automated packaging device 555.

According to at least one embodiment, system 500 further comprises a second function sorting system 504, wherein an output of automated packaging device 555 is provided as an input to second function sorting system 504. According to one embodiment, an output of first function sorting system 503 is directly provided as an input to second function sorting system 504. According to one embodiment, an output of 3D sorting system 503A is directly provided as an input to second function sorting system 504. According to one embodiment, an output of the first function sorting system 503 is provided as an input to an elevator 512 for delivery to second function sorting system 504. According to one embodiment, an output of the second function sorting system 504 is provided as an input to the first function sorting system 503. According to at least one embodiment, an output of the first function sorting system 503 is provided as an input to an article lift 301A of a 3D sorting system for delivery to the second function sorting system 504 by passing automated packaging device 555. According to one embodiment, an output of the first function sorting system 503 is provided as an input to a computer controlled vehicle such as, for example, a second function vehicle 212, for delivery to second function sorting system 504. According to at least one embodiment, first function sorting system 503 operates to sort a first set of items or articles such as articles 20, and second function sorting system 504 operates to sort a second set of items such as packages 24.

According to various embodiments, second function sorting system 504 comprises second function vehicles 212 different from the first function vehicles 112. Second function vehicles 212 traverse a second function platform 18 spaced apart from the first function platform for transporting and depositing second function articles such as, for example, packages 24 that are different from the first function articles such as articles 20 into second destination sort receptacles such as, for example, second function sort receptacles 501 that are different from the first function sort receptacles such as, for example, first function sort receptacles 401. In one embodiment, second function platform 18 is arranged above first function platform 16 in a vertical stacked configuration on a same footprint whereby the total footprint needed for both systems is equal to the footprint needed for one of those two systems; optionally, the total footprint needed for both systems is equal to just the footprint needed for the larger of two those systems.

In one embodiment, second function sorting system 504 comprises a package sorting system configured to direct a package computer controlled vehicles in the form of second function vehicles 212. According to one embodiment, the second function sorting system 504 directs a second function vehicles 212 to move to a receiving position about an automated packaging device for receiving a package from the automated packaging device 555. The package sorting system (that second function sorting system 504 comprises of) is further configured to direct a second function vehicle 212 to transport and deposit the package 24 into a package receptacle such as second function sort receptacles 501. According to at least one embodiment, the second function vehicles 212 traverses a package sorting platform such as second function platform 18. According to at least one embodiment, the elevator 512 transfers the second function vehicles 212 from first function platform 16 to second function platform 18. In one embodiment, an elevator such as elevator 512 is configured to transfer the second function vehicles 212 between a floor level and the second function platform 18 spaced apart from the floor level. In one embodiment, the package computer controlled vehicle in the form of the second function vehicle 212 deposits the package 24 at a package lift of a post-packing sorting system that may take the form of one or more of the second function sorting system 504, receptacle exchanger 422, and/or package transfer system 565.

According to at least one embodiment, the second function sorting system 504 comprises one or more of a: conveyorized device, robotic arm sorter, tilt tray sorter, sweep sorter, activated roller sorter, cross belt sorter, split tray sorter, track-type sorter, chute, lift, elevator, autonomous mobile robot (AMR), gantry crane, rail-based equipment, automated guided vehicle (AGV), and self-propelled receptacle.

According to one embodiment, the first function sorting system 503 is configured for order consolidation sortation wherein articles, for e.g., prescription medication or drug containers, are delivered to receptacles with each receptacle receiving all articles belonging to one order and wherein the second function sorting system is configured for shipping sortation, alternately referred to as parcel sortation, wherein letters or parcels (i.e., articles) with addresses on them are delivered to receptacles with each receptacle corresponding to a delivery zone or route. When all articles required to fulfill or complete an order get collected in a first function sort receptacle 401 as directed by the controller or by server 502, the first function sort receptacles 401 containing the articles associated with that order is removed and taken to location for further processing such as, for example, a packing station, as directed by the controller. According to one embodiment, an output of the first function sorting system 503 and an output of the second function sorting system 504 are combined together and provided as an input to a third function sorting system. According to one embodiment, an output of one of the first function sorting system 503 and the second function sorting system 504 is provided as an input to a third function sorting system; according to one embodiment, the third function sorting system is configured for parcel sortation. According to one embodiment, the first function sorting system 503 is configured for sorting of articles above a threshold size, the second function sorting system 504 is configured for sorting of articles below the threshold size, and the outputs of the first and second function sorting systems are provided as an input for placing into a put wall. As used herein, "put wall" refers to a series of dedicated shelving that increase efficiency during the order consolidation process. Put walls can handle a large volume of orders in a small footprint by allowing an operator to manually put items into cubbies on the wall, each cubby being associated with one order. This process streamlines the supply chain by increasing order accuracy and reducing walking to and from inventory storage. In one embodiment, outputs of the first and second function sorting systems are provided as an input to a wall of sorting cubbies (e.g., a put wall) for an operator to transfer all articles associated with each customer order to a respective sorting cubby.

According to one embodiment, an output of the second function sorting system 504 is provided as an input to a conveyor or a lift for delivery to a third function sorting system. According to one embodiment, outputs of the first and second function sorting systems are provided as an input to an induction lift for delivery to a third function sorting system configured for parcel sorting. In some embodiments, the third function sorting system may have same or similar characteristics as second function sorting system 504 or receptacle exchanger 422. According to one embodiment, outputs of the first and second function sorting systems are provided as an input to an induction lift for delivery to a third function sorting system configured for parcel sorting. As used herein, "induction lift" refers to an induction system including a lift for carrying an inducted item to a different level than the inducted level where a different system such as AMRs, conveyors, or similar other material transfer or material handling systems can move or carry the inducted item to an intended location. The induction into the induction lift can be performed manually or in an automated manner. The induction lift may have the ability to go up to 5 sortation levels high to further reduce the footprint of the overall system. The induction lift operates to generate more volume in a multi-level system as AMRs can be spread across a larger surface area. This allows greater throughput capabilities and creates larger batch pick opportunities for an order fulfillment system since the lift eliminates the need to create separate batches for each level.

According to at least one embodiment, system 500 further comprises a package transfer system 565 configured to direct a computer-controlled conveyance mechanism 314 to transfer the package 24 from the automated packaging device 555 for delivery to a post-packing sorting system. In one embodiment, the post-packing sorting system takes the form of the second function sorting system. According to at least one embodiment, the computer-controlled conveyance mechanism 314 comprises a robotic arm configured to transfer the package to one or more of a: conveyor system, shuttle, AGV, and robotic vehicle, for delivery to the post-packing sorting system. In one embodiment, the post-packing sorting system takes the form of, for e.g., the second function sorting system.

In some embodiments, the system further comprises one or more conveyor systems such as conveyor 316. As well understood in the art, a sortation conveyor system such as conveyor 316 operates to convey and distribute articles along moving conveyor surfaces and diverts selected articles onto a particular conveying branch. Sortation conveyors often employ a plurality of pusher elements which may be selectively moved across the conveying surface in order to divert an article from the primary conveying path and onto a secondary conveying branch. Sortation conveyors have a primary conveying surface which can comprise an endless conveyor belt loop formed from plurality of transverse rollers or slats. When it is necessary to direct an article from the moving conveying path and onto a secondary conveying branch, a switch or switch mechanism is actuated to cause an assigned set of pusher elements to be diverted across the moving conveyor surface. The transversely diverted pusher elements engage the article to the secondary conveying branch, such as a takeaway conveyor. Sortation conveyors often use divert tracks or guide surfaces which direct the assigned set of pusher elements laterally across the conveying surface, while pusher elements which are not assigned pass by the divert tracks and continue to travel along the conveying surface in their set position. Shoe sorters represent another type of sortation sorters. Dual sided shoe sorters can provide a higher density sortation solution with each side of the sorter acting as a single sided shoe sorter that is fed from respective induction conveyors. However, such generally known dual sided shoe sorters often require pre-sorting and separate conveyance of article to respective sides of the dual sided shoe sorter.

According to one embodiment, outputs of the first and second function sorting systems are provided as an input to a single belt conveyor positioned adjacent to a floor level for delivery to automated packaging device 555. In other words, the single belt conveyor may be positioned close to the floor level whereby in one embodiment the single belt conveyor is positioned right below the first function platform 16 or second function platform 18. According to one embodiment, an output of automated packaging device 555 is provided as an input to an induction lift for delivery to a third function sorting system configured for parcel sorting.

In some embodiments, a package 24 output from an outlet of automated packaging device 555 is handled by a package transfer system 565 in communication with server 502. In at least one embodiment, package transfer system 565 comprises computer-controlled conveyance mechanism 314. For example, in one embodiment, package transfer system 565 directs computer-controlled conveyance mechanism 314 comprising a robotic arm to transfer a package 24 that is output from automated packaging device 555 onto a second function vehicle 212. In one embodiment, package transfer system 565 directs a computer-controlled conveyance mechanism 314 in the form of robotic arm to transfer a package 24 output from automated packaging device 555 onto a conveyor 316. According to at least one embodiment, system 500 further comprises one or more of: a conveyor, and a ramp providing access to and from the conveyor for vehicles such as first function vehicles 112 and second function vehicles 212 and similar other vehicles to travel thereon.

In one embodiment, computer-controlled conveyance mechanism 314, for example in the form of a robotic arm, operates to transfer a package 24 output by automated packaging device 555 onto a conveyor system. By contrast, in a different embodiment, package 24 output by automated packaging device 555 is transferred onto a second function vehicle 212. Conveyor 316 may then be directed by server 502 to transport the inducted package 24 to the location of further processing.

Figure 14:
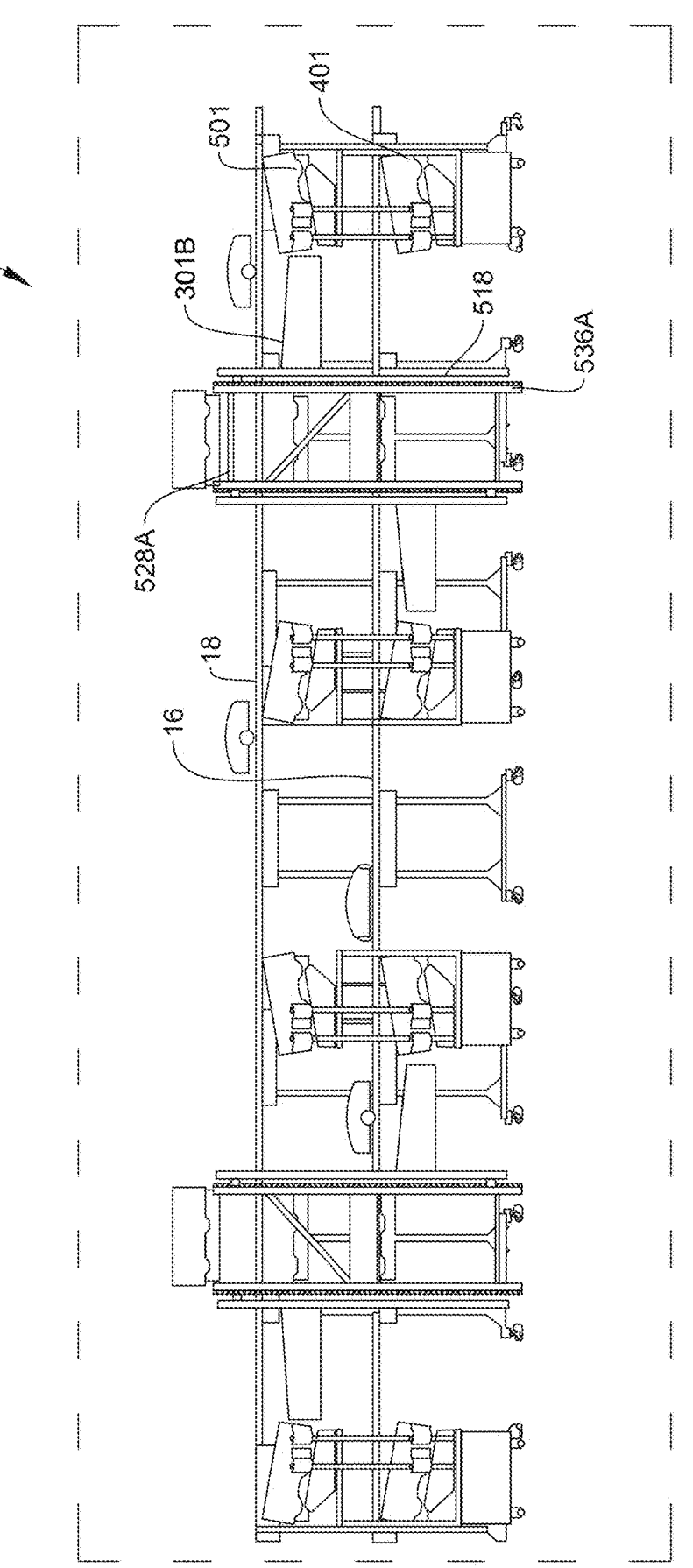
FIG. 14 depicts a side view of a portion of the system of FIG. 1 that comprises a receptacle exchanger, according to one or more implementations of the presently disclosed subject matter.

According to at least one embodiment, system 500 further comprises a receptacle storage and receptacle buffering system by way of receptacle exchanger 422. As illustrated, for example, in FIG. 14, in various embodiments, receptacle exchanger 422 comprises one or more sets of shelves 536A. Each shelf 536 comprises a plurality of storage locations 528A arranged in one or more levels for e.g., vertically in a rectangular layout. Receptacle exchanger 422 further comprises a frame 518 positioned adjacent the shelf 536A. In one embodiment, a frame 518 is positioned adjacent shelf 536A. Frame 518 comprises at least one receptacle lift 301B, one or more vertical rails, and one or more horizontal guide tracks. In one embodiment, frame 518 comprises a receptacle lift 301B traveling about one or more vertical rails. Receptacle lift 301B is configured for transferring a receptacle such as first function sort receptacle 401 or a second function sort receptacle 501 from an article receiving position to a storage location 528 of the shelf 536A. In various embodiments, one or two vertical rails translate horizontally about two horizontal guide tracks arranged parallel to one another. In at least one embodiment, receptacle exchanger 422 is configured to direct, by a receptacle exchange engine in communication with server 502, a receptacle lift 301B to transfer a first function sort receptacle 401 or a second function sort receptacle 501 from a storage location 528A of the shelf 536A to an article receiving position about first function platform 16 or about second function platform 18.

According to at least one embodiment, server 502 is configured to direct a receptacle lift 301B to transfer a completed order first function sort receptacles 401 from the article receiving position onto a receptacle transport vehicle 312 for transporting to a location of further processing. According to at least one embodiment, system 500 is configured to direct the receptacle lift 301B to transfer a full first function sort receptacles 401 from the article receiving position onto a receptacle transport vehicle 312 for transporting to a location of further processing. According to at least one embodiment, server 502 is configured to direct a receptacle lift 301B to transfer a second function sort receptacle 501 from the article receiving position onto a receptacle transport vehicle 312 for transporting to a location of further processing. According to at least one embodiment, system 500 is configured to direct the receptacle lift 301B to transfer a second function sort receptacle 501 from the article receiving position onto a receptacle transport vehicle 312 for transporting to a location of further processing.

In various embodiments, system 500 is configured to: determine, for e.g., by the receptacle exchange engine or by server 502, that a first function sort receptacles 401 containing one or more sorted articles 20 is ready to be transferred. System 500 is further configured to: direct, for e.g., by receptacle exchange engine or server 502, receptacle lift 301B to transfer first function sort receptacles 401 from an article receiving position about first function platform 16 to a storage location 528A of shelf 536A. System 500 is further configured to: direct, for e.g., by a receptacle exchange engine or server 502, receptacle lift 301B to transfer first function sort receptacles 401 from an article receiving position to a position about a receptacle transport vehicle 312. In some embodiments, server 502 may, by itself or in combination with other components of system 500, perform the functions of receptacle exchange engine. In one embodiment, system 500 is configured to direct, by the receptacle exchange engine, the receptacle lift 301B to transfer an empty first function sort receptacle 401 from a storage location of the shelf to an article receiving position.

In various embodiments, system 500 is configured to: determine, for e.g., by the receptacle exchange engine or by server 502, that a second function sort receptacle 501 containing one or more sorted packages 24 is ready to be transferred. System 500 is further configured to: direct, for e.g., by receptacle exchange engine or server 502, receptacle lift 301B to transfer second function sort receptacle 501 from an article receiving position about second function platform 18 to a storage location 528A of shelf 536A. System 500 is further configured to: direct, for e.g., by a receptacle exchange engine or server 502, receptacle lift 301B to transfer second function sort receptacle 501 from an article receiving position to a position about a receptacle transport vehicle 312. In one embodiment, system 500 is configured to direct, by the receptacle exchange engine, the receptacle lift 301B to transfer an empty second function sort receptacle 501 from a storage location of the shelf to an article receiving position.

According to at least one embodiment, system 500 is configured to operate the storage location 528A of the shelf 536A as a buffering storage place for a completed order receptacle such as first function sort receptacle 401 and second function sort receptacle 501. According to at least one embodiment, system 500 is configured to operate the storage location 528A of the shelf 536A as a buffering storage place for a full receptacle such as first function sort receptacle 401 and or second function sort receptacle 501. According to at least one embodiment, system 500 is configured to operate the storage location 528A of the shelf 536A as a buffering storage place for empty receptacles such as first function sort receptacles 401 and empty second function sort receptacles 501.

In at least one embodiment, one or more vehicles such as first function vehicles 112, second function vehicles 212, and receptacle transport vehicles 312 may include the following: a base comprising wheels, at least a first motor driving the wheels, and batteries powering said first motor; an extendible lift coupled to the base, the extendible lift comprising a folding framework rising to any of a plurality of heights above said base by expansion of the folding framework; and a retriever coupled to the extendible lift, the retriever comprising a platform and an electromagnet coupled to a second motor, wherein the second motor moves the electromagnet forwards about said platform towards a shelf, wherein the electromagnet magnetically couples to any of an item or bin when the electromagnet is activated, and wherein the second motor reverses direction moving the electromagnet backward about said platform and retrieving the item or bin from said shelf.

According to one embodiment, the first function sorting system 503 is configured for a first sorting task, and the second function sorting system 504 is configured for a second sorting task. For example, in at least one embodiment, the first function sorting system 503 is configured for order consolidation. In at least one embodiment, the second function sorting system 504 is configured for consolidating each order into a parcel. In at least one embodiment, the first function sorting system 503 is configured for order consolidation, and the second function sorting system 504 is configured for consolidating for parcel sortation. In at least one embodiment, the first function sorting system 503 is configured for store pick-up ecommerce sortation, and the second function sorting system 504 is configured for store replenishment. In at least one embodiment, the first function sorting system 503 is configured for sorting of articles with size above a threshold value, and the second function sorting system 504 is configured for sorting of articles with size below a threshold value. In at least one embodiment, the first function sorting system 503 is configured for sorting of fragile articles, and the second function sorting system 504 is configured for sorting of non-fragile articles. In at least one embodiment, the first function sorting system 503 is configured for sorting of articles to be consolidated into kits, and the second function sorting system 504 is configured for parcel sortation.

In at least one embodiment, the first function sorting system 503 is configured for sorting of articles to be assembled into a finished product, and the second function sorting system 504 is configured for parcel sortation. In at least one embodiment, the first function sorting system 503 is configured for sorting of articles into a route stop sequence, and the second function sorting system 504 is configured for sorting of the output of the first function sorting system to a route comprising the route stop sequence. In at least one embodiment, the first function sorting system 503 is configured for sorting of articles comprising consumer goods such as, for example, apparel to an automated packing machine, and the second function sorting system 504 is configured for sorting of the output of the first function sorting system to one of shipping containers and gaylords.

In at least one embodiment, the first function sorting system 503 is configured for sorting of articles above a threshold size, and the second function sorting system 504 is configured for sorting of articles below a threshold size article, and outputs of the first function sorting system 503 and second function sorting system 504 are combined and provided to a third function sorting system. In at least one embodiment, the first function sorting system is configured for sorting of articles above a threshold size, and the second function sorting system 504 is configured for sorting of articles below a threshold size article, wherein outputs of the first function sorting system 503 and second function sorting system 504 are provided for output to a put wall.

In at least one embodiment, the system further comprises: a light curtain provided at or near one or of: first function sort receptacles 401, and second function sort receptacles 501. In at least one embodiment, the system further comprises: a light curtain provided at one or more of: the first function vehicles, and the second function vehicles.

FIG. 15 depicts a flowchart of an exemplary implementation of an improved system for use in directing an order fulfillment operations, for e.g., in a centralized or localized sorting facility, according to one or more implementations of the presently disclosed subject matter. In one embodiment, as shown in FIG. 15, a method of implementing an improved system for use in directing an order fulfillment operation may comprise, at step 702, receiving, at a server, a batch of orders, each order including one or more articles. The method may further comprise, at step 704, directing, by the server, a retrieval mechanism of an ASRS to present bins containing articles needed for the batch of orders. The method may furthermore comprise, at step 706, directing, by the server, by the server, of a human or robot to load the articles retrieved from the ASRS. The method may also comprise, at step 708, directing, by the server, of the computer-controlled transport vehicles to transport and deliver the articles to respective order receptacles. The method may additionally comprise, at step 710, determining, by the server, when each order is complete.

FIG. 16 depicts a flowchart of an exemplary implementation of an improved system for use in directing an order fulfillment operations, for e.g., in a centralized or localized sorting facility, according to one or more implementations of the presently disclosed subject matter. In one embodiment, as shown in FIG. 16, a method of implementing an improved system for use in directing an order fulfillment operations may comprise, at step 802, directing, by a server, the delivery of articles associated with an order at a repository of an automated packaging device, wherein the articles are retrieved from an ASRS and sorted by an order sortation system. The method may further comprise, at step 804, directing, by the server, the receiving of the sorted articles at a repository of an automated packaging device. The method may also comprise, at step 806, directing, by the server, o of the automated packaging device to seal the repository to form a package. The method may additionally comprise, at step 808, directing, by the server, of a package computer-controlled transport vehicle to move to a receiving position about the automated packaging device for receiving the package from the automated packaging device. The method may further comprise, at step 810, directing, by the server, of the package computer-controlled vehicle to transport and deliver the received package to a post-packing sorting system.

According to various embodiments, system 500 further comprises an article information acquisition device 506. In one implementation, article information acquisition device 506 interacts with the article can include determining an identifier of the article. This may be used when information concerning the identity of the article is unknown prior to picking of the article. Accordingly, the article may be scanned or imaged to determine a designated grouping. For example, for parcels, an address may be scanned and used for determining which route group to use for the parcel. Determining an identifier of the article may include scanning a barcode (or other suitable type of machine-readable code or information), reading an RFID tag, or reading another type of wireless identifier signal, visually classifying the article using computer vision analysis, and/or using some other identification or classification technique.

Herein, reference made to "articles" characterizes the objects subjected to sortation by system 500. An article can be any suitable type of object such as a package, a parcel, a product, raw material good (e.g., a manufactured part), and/or any suitable type of object that needs sortation organization. In the case of shipping or other operational contexts, an article may have various properties. In a parcel processing center, articles could be, for example: boxed goods, bagged goods, and/or parcels. An article could have destination information indicating where it should be shipped. An article could have an article type information that could correspond to a stock keeping unit (SKU) identifier or an alternative product identifier.

Herein, reference is also made to receptacles such as first function sort receptacles 401 and second function sort receptacles 501, which is used to characterize the receptacle used to hold articles or packages once sorted. The form factor and variety of the receptacles can vary greatly, and the system may be adapted to diverse types of receptacles such as boxes, receptacles, chutes, bins, trays, bags, gaylords, and the like. Article receptacles may use any suitable form factor and, in some cases, may use the same type of receptacle. In some variations, the form factor may be customized for particular variations and implementations of order fulfillment system 500 as described herein.

In various embodiments, server 502 is a control server or a controller that is configured for communicating with one or more components of order fulfillment system 500 as described herein, and as shown, for example, in FIG. 1. In one implementation, server 502 includes memory, a processor, and/or one or more communication interfaces communicatively coupled to each other. A network may form part of order fulfillment system 500, wherein the network may take on any appropriate form, including a wireless network such as Wi-Fi, cellular, or other frequency bands for private use, or a hard-wired network such as LAN, WAN, internet, etc., and combinations thereof. In one implementation, server 502 may communicate over the network with the cloud. In some implementations, one or more components of server 502 may reside in the cloud. Similarly, several of the components such as, for example, article information acquisition device 506, wireless access point 514, computer-controlled vehicles such as receptacle transport vehicles

312, and server 502 may communicate over the network with the cloud. In some implementations, one or more components of order fulfillment system 500 may reside in the cloud. For example, in one implementation, server 502 may reside in the cloud. In at least one implementation, server 502 may be in communication with one or more third-party servers, such as warehouse management system servers and automated transport device operations control servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, server 502 can be or can include a cloud server. The term "cloud server" as used herein includes any pooled, centralized server resource that is hosted and delivered over a network-typically the Internet- and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions as a traditional physical server including delivering processing power, storage, and applications. One of the advantages of cloud storage is that there are many distributed resources acting as one-often called federated storage clouds. This makes the cloud very tolerant of faults, due to the distribution of data. Use of the cloud can reduce the creation of different versions of files, due to shared access to documents, files, and data.

Each of the components shown or mentioned in FIGS. 1-16 may be in communication with one or more other components through a wired and/or a wireless network. For example, the cloud, the server 502 may further communicate with all other components illustrated in FIG. 1 including first function sort receptacles 401, sortation engine 442, article information acquisition devices 506, receptacle transport vehicles 312, ASRS 302, first function sorting system 503, 3D sorting system 503A, second function sorting system 504, automated packaging device 555, and wireless access point 514 over a network.

The systems and methods described herein may advantageously eliminate the need to batch/aggregate like product, either by like product type, or customer type, or store type (aka 'buffer sequencing'), and to just flow each product/item of the customer or store orders as they flow to the warehouse for picking and unit sortation. By directly routing items from an article storage and retrieval system to an order sorting or sortation system for collation/packing/shipping, the need to sequence orders upfront may be greatly reduced or even eliminated. This reduction in sequencing may result in significantly reducing or even eliminating the wait times associated with article aggregation. Consolidating an article storage and retrieval system with an item sorting or sortation system advantageously allows articles to be immediately diverted to an appropriate final collation or destination station for collation as orders and packing, each destined for a retail location (e.g., store) or for delivery to an end customer (e.g., customer home address, work address, post office box, locker). As a result, there are no intermediate operations related to determining which sequence articles should be retrieved and sorted in the process of retrieving the correct items and sorting those items for packing and/or shipping. The systems and methods described herein may further advantageously provide for order cycling wherein a wave of picks are done and still have some outstanding articles to arrive, but the system decides not to hold up the location, so the location is moved up until it is ready or needed. The inventions disclosed herein thus can advantageously overcome various limitations and challenges faced in the art.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated transport device set up meant for transporting or transferring articles of disparate sizes. For instance, the disclosed apparatus and method may find applications in conjunction with pick-assist robot applications. Similarly, the disclosure here is also relevant to lifting robots and several other types of robots used in warehouse and material handling facility applications. In another exemplary application, order fulfillment system 500 can be used for returned goods processing and/or good restocking. For example, mixed article receptacles of returned goods could be appropriately sorted for reshelving, restocking, or other subsequent processing. In another example, newly received article orders could be sorted into appropriate receptacles for replenishing article stock within a store. The size and automated affordances of order fulfillment system 500 is such that it could be used in a variety of environments such as in a back-warehouse of a retail store or in an order fulfillment center (e.g., such as for ecommerce returns). In another exemplary application, order fulfillment system 500 may be used for order fulfillment where a collection of articles is sorted into individual article receptacles, where each article receptacle may be associated with a particular order. In some embodiments, the orders may be, for e.g., for consumers such as ecommerce orders; in at least one example, the orders represent commercial orders for delivery to a business. In an analogous manner, order fulfillment system 500 may also be used for dynamic or custom kitting for industrial or consumer goods.

A person of ordinary skill in the art would understand that the embodiments described in this application are examples, and that the scope of this application is not limited by these examples or embodiments. For instance, while the preferred embodiment relates to order sorting in a warehouse or industrial facility, the apparatus and method described herein would apply equally well to any material handling environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment comprising software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM [erasable programmable read-only memory] or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An order fulfillment system comprising:

first function sorting system comprises first function vehicles traveling on a first function platform raised from a surface for transporting and depositing first function articles to be sorted into a plurality of first function sort receptacles in response to commands;

an article storage and retrieval system (ASRS) juxtaposed to the first function sorting system such that a footprint occupied by the first function sorting system is adjacent to the footprint occupied by the ASRS, the article storage and retrieval system comprising a three-dimensional array of storage spaces from which the first function articles to be sorted are automatically retrievable by one or more retrieval mechanisms in response to commands; and, a controller configured to:

direct a retrieval mechanism of the article storage and retrieval system to move a storage bin containing a first function article to an output station; and, direct a first function vehicle to transport and deposit the first function article collected from the storage bin at the output station into a first function sort receptacle.

2. The system of claim 1, wherein the retrieval mechanism further comprises a lift to transfer the first article from the storage bin to one of: (a) the output station, and (b) a position about the first function vehicle.

3. The system of claim 1, further comprising a receptacle exchanger, wherein the receptacle exchanger comprises: a shelf comprising a plurality of storage locations arranged in one or more levels; and, a frame positioned adjacent the shelf, the frame comprising a lift configured for transferring the receptacle to a storage location of the shelf, wherein the system is configured to direct, by a receptacle exchange engine, the lift to transfer the receptacle from a storage location of the shelf to an article receiving position.

4. The system of claim 1, further comprising an automated packaging device configured to: receive one or more sorted first function articles through an opening of a repository of the automated packaging device, and seal the repository to form a package.

5. The system of claim 4, further comprising a 3D (three-dimensional) sorting system, the 3D sorting system comprising:

two shelves, each shelf composed of a plurality of storage locations vertically arranged on the shelf, each storage location configured to accept therein an article receptacle; and, an article lift translating along three axes about a conveying rail frame, the conveying rail frame arranged between the two shelves and parallel to at least one of the two shelves, the article lift configured to sort an article received at the article lift to one of an article receptacle located at one of the plurality of storage locations of a shelf responsive to instructions received from the controller.

6. The system of claim 5, wherein an output of the first function sorting system is provided as an input to the 3D sorting system, wherein an output of the 3D sorting system is provided as an input to the automated packaging device; and wherein a package output by the automated packaging device is provided as an input to a second function sorting system.

7. The system of claim 1, further comprising a second function sorting system, wherein an output of one of the first function sorting system is provided as an input to the second function sorting system.

8. The system of claim 7, wherein an output of the first function sorting system is provided as an input to one or more of: a lift, an elevator, and a computer controlled vehicle, for delivery to the second function sorting system.

9. The system of claim 7, wherein the second function sorting system comprises second function vehicles different from the first function vehicles traversing a second function platform spaced apart from the first function platform for transporting and depositing second function articles different from the first function articles into second destination sort receptacles different from the first function sort receptacles.

10. The system of claim 7, wherein the second function sorting system comprises a package sorting system configured to:

direct a package computer controlled vehicle to move to a receiving position about an automated packaging device for receiving a package from the automated packaging device, and direct the package computer controlled vehicle to transport and deposit the package into a package receptacle.

11. The system of claim 10, wherein the package computer controlled vehicle traverses a package sorting platform; and, wherein an elevator is configured to transfer the package computer controlled vehicle between a floor level and the package sorting platform spaced apart from the floor level.

12. The system of claim 10, wherein one of:
an elevator transfers the package computer controlled vehicle from a floor level to a package sorting platform spaced apart from the floor level; or
the package computer controlled vehicle deposits the package at a lift of the second function sorting system.

13. The system of claim 7, wherein the second function sorting system comprises one or more of a: conveyorized device, robotic arm sorter, tilt tray sorter, sweep sorter, activated roller sorter, cross belt sorter, split tray sorter, track-type sorter, chute, lift, elevator, autonomous mobile robot (AMR), gantry crane, rail-based equipment, auto-mated guided vehicle (AGV), and self-propelled first desti-nation container.

14. The system of claim 4, further comprising a package transfer system configured to direct a computer-controlled conveyance mechanism to transfer the package from the automated packaging device for delivery to a second func-tion sorting system.

15. The system of claim 14, wherein the computer-controlled conveyance mechanism comprises a robotic arm configured to transfer the package to one or more of a: conveyor system, shuttle, AGV, and robotic vehicle, for delivery to the second function sorting system.

16. The system of claim 1, further comprising a receptacle exchanger, the receptacle exchanger comprising: a shelf comprising a plurality of storage locations arranged in one or more levels; and, a frame positioned adjacent the shelf, the frame comprising a lift configured for transferring the receptacle to a storage location of the shelf, wherein the system is configured to direct, by a receptacle exchange engine, the lift to transfer the receptacle from a storage location of the shelf to an article receiving position.

17. The system of claim 16, wherein the system is further configured to operate the storage location of the shelf as a buffering storage place for one or more of a: completed order receptacle, full receptacle, and empty receptacle.

18. The system of claim 16 wherein the system is further configured to direct the lift to transfer one of: (a) a complete order receptacle, and (b) a full receptacle, from the article receiving position to the storage location of the shelf.

19. The system of claim 16, wherein the system is further configured to direct the lift to transfer one of: (a) a complete order receptacle, and (b) a full receptacle, from the article receiving position onto a receptacle transport device for transporting to a location of further processing.

20. The system of claim 16, wherein the system is further configured to one or more of:
direct the lift to transfer an empty receptacle from a position about a receptacle transport device to the storage location of the shelf; and,
direct the lift to transfer the receptacle from a storage location of the shelf to a receptacle transport device, wherein the receptacle transport device transports the receptacle to a location of further processing.

* * * * *